United States Patent
Ji et al.

(10) Patent No.: US 12,231,645 B2
(45) Date of Patent: Feb. 18, 2025

(54) FRAME SKIPPING TECHNIQUES IN VIDEO ENCODING AND DECODING METHOD

(71) Applicant: HUAWEI TECHNOLOGIES CO., LTD., GuangDong (CN)

(72) Inventors: Jun Ji, Hangzhou (CN); Changcai Lai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 190 days.

(21) Appl. No.: 17/830,062

(22) Filed: Jun. 1, 2022

(65) Prior Publication Data

US 2022/0295071 A1    Sep. 15, 2022

Related U.S. Application Data

(63) Continuation of application No. PCT/CN2020/133053, filed on Dec. 1, 2020.

(30) Foreign Application Priority Data

Dec. 2, 2019   (CN) .......................... 201911213271.4

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/137* (2014.11); *H04N 19/172* (2014.11)

(58) Field of Classification Search
None
See application file for complete search history.

(56) References Cited

U.S. PATENT DOCUMENTS 9,131,202 B1    9/2015  Espeset et al.
2001/0031003 A1*  10/2001  Sawhney ............. H04N 19/107
                                    375/E7.25
(Continued)

FOREIGN PATENT DOCUMENTS

CA    2949478 A1    12/2015
CN    102196253 A    9/2011
(Continued)

OTHER PUBLICATIONS

M. Domański et al., "Title: Spatio-Temporal Scalability in AVC codecs", International Organisation for Standardisation Organisation Internationale De Normalisation ISO/IEC JTC1/SC29/WG11 Coding of Moving Pictures and Audio, Pattaya, Mar. 2003, 12 total pages.

(Continued)

*Primary Examiner* — Chikaodili E Anyikire
(74) *Attorney, Agent, or Firm* — Rimon PC

(57) ABSTRACT

This application provides a video encoding/decoding method, a corresponding video encoding/decoding apparatus. The video encoding method includes: obtaining a to-be-encoded video; encoding the to-be-encoded video to obtain a first bitstream and a second bitstream before outputting the first and second bitstreams. The first bitstream is obtained by performing frame skipping and encoding on the to-be-encoded video, and the second bitstream is obtained by encoding video frames in a second frame sequence by using video frames in a first frame sequence as key frames. The first frame sequence includes video frames obtained by downsampling video frames in the to-be-encoded video that are encoded into the first bitstream, and the second frame sequence includes video frames obtained by downsampling video frames in the to-be-encoded video that are not encoded into the first bitstream. The technical solutions (Continued)

provided in this application help improve video image prediction accuracy.

20 Claims, 9 Drawing Sheets

(51) Int. Cl.
*H04N 19/137* (2014.01)
*H04N 19/172* (2014.01)

(56) References Cited

U.S. PATENT DOCUMENTS

| | | | | |
|---|---|---|---|---|
| 2006/0088101 | A1* | 4/2006 | Han | H04N 19/31 375/240.16 |
| 2007/0160153 | A1* | 7/2007 | Sullivan | H04N 19/61 375/E7.193 |
| 2017/0083762 | A1* | 3/2017 | Segalovitz | G06V 30/142 |

FOREIGN PATENT DOCUMENTS

| | | |
|---|---|---|
| CN | 103813174 A | 5/2014 |
| CN | 104798373 A | 7/2015 |
| CN | 109068134 A | 12/2018 |
| CN | 109246477 B | 4/2021 |
| KR | 20100038674 A | 4/2010 |

OTHER PUBLICATIONS

Woo-Jin Han et al., "Successive Temporal Approximation and Referencing (STAR) for improving MCTF in Low End-to-end Delay Scalable Video Coding", International Organisation for Standardisation Organisation Internationale De Normalisation, ISO/IEC JTC 1/SC 29/WG 11 MPEG2003/M10308, Hawaii, USA, Dec. 2003, 26 total pages.
Sullivan, G.J et al., "Standardized Extensions of High Efficiency Video Coding (HEVC)", TR2013 105, Oct. 2013, 19 total pages.
International Telecommunication Union,Series H: Audiovisual and Multimedia Systems Infrastructure of audiovisual services Coding of moving video,H.264,(May 2003),total:382pages.
ITU-T,Series H: Audiovisual and Multimedia SystemsInfrastructure of audiovisual services Coding of moving video,"High efficiency video coding",H.265,(Oct. 2014),total:26pages.

* cited by examiner

S1010

Obtain a to-be-decoded bitstream, where the to-be-decoded bitstream includes a first bitstream and a second bitstream, the first bitstream is a bitstream obtained by performing frame skipping and encoding on a source video, the second bitstream is a bitstream obtained by encoding video frames in a second frame sequence by using video frames in a first frame sequence as key frames, the first frame sequence includes video frames obtained by downsampling video frames in the source video that are encoded into the first bitstream, and the second frame sequence includes video frames obtained by downsampling video frames in the source video that are not encoded into the first bitstream

S1020

Determine a target video based on the first bitstream and the second bitstream, where the target video includes content expressed in the source video

FIG. 10

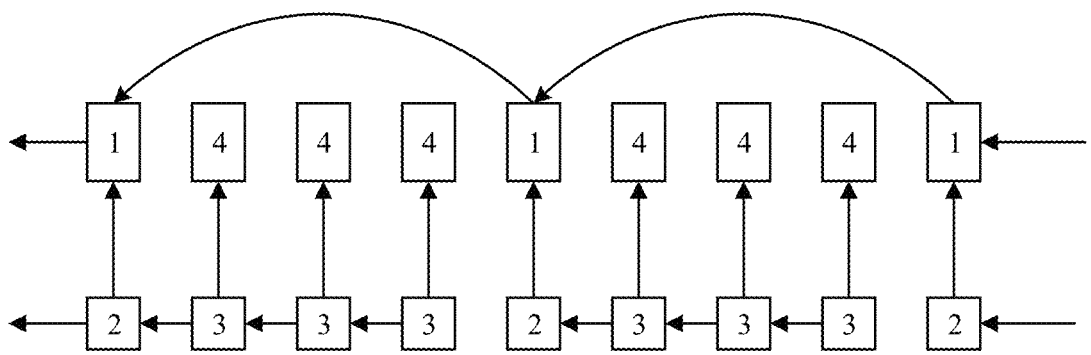

FRAME SKIPPING TECHNIQUES IN VIDEO ENCODING AND DECODING METHOD

CROSS-REFERENCE TO RELATED APPLICATIONS

This application is a continuation of International Application No. PCT/CN2020/133053, filed on Dec. 1, 2020, which claims priority to Chinese Patent Application No. 201911213271.4, filed on Dec. 2, 2019. The disclosures of the aforementioned applications are hereby incorporated by reference in their entireties.

TECHNICAL FIELD

This application relates generally to the field of video coding, and in particular, to a video encoding method, a video decoding method, and a corresponding apparatus.

BACKGROUND

Digital video capabilities can be incorporated into a wide variety of apparatuses, including digital televisions, digital live broadcast systems, wireless broadcast systems, personal digital assistants (PDAs), laptop or desktop computers, tablet computers, e-book readers, digital cameras, digital recording apparatuses, digital media players, video game apparatuses, video game consoles, cellular or satellite radio phones (so-called "smartphones"), video conferencing apparatuses, video streaming apparatuses, and the like.

Digital video apparatuses implement video compression technologies, for example, video compression technologies described in standards defined by MPEG-2, MPEG-4, ITU-T H.263, and ITU-T H.264/MPEG-4 Part 10 advanced video coding (AVC), the video coding standard H.265/high efficiency video coding (HEVC) standard, and extensions of such standards. The video apparatuses can transmit, receive, encode, decode, and/or store digital video information more efficiently by implementing such video compression technologies.

Temporal (inter-picture) prediction can be performed by using video compression technologies, to reduce or remove inherent redundancy in a video sequence. An image may be referred to as a frame.

In a conventional video compression technology, an encoded bitstream is obtained through frame skipping and encoding; then, decoding is performed on a decoder side to obtain an image that is encoded after frame skipping, and an intermediate frame that is skipped during encoding is predicted in a frame interpolation manner, to predict a source video. Compared with the source video, a video predicted in this coding scheme has large distortions, that is, a problem of low prediction accuracy.

For example, in a scenario in which the content of a source video includes a complex motion such as a large motion, an irregular motion, or a fluid motion, and the content of two consecutive video frames in the source video differs greatly, distortion is particularly prominent when a conventional video compression technology is used for obtaining an encoded bitstream and restore the source video based on the encoded bitstream.

SUMMARY

This application provides a video encoding method, a video decoding method, a corresponding video encoding apparatus, and a corresponding video decoding apparatus, to improve video image prediction accuracy to some extent, and improve coding performance.

According to a first aspect, this application provides a video encoding method. The method includes: obtaining a to-be-encoded video; encoding the to-be-encoded video to obtain a first bitstream and a second bitstream, where the first bitstream is a bitstream obtained by performing frame skipping and encoding on the to-be-encoded video, the second bitstream is a bitstream obtained by encoding video frames in a second frame sequence by using video frames in a first frame sequence as key frames, the first frame sequence includes video frames obtained by downsampling video frames in the to-be-encoded video that are encoded into the first bitstream, and the second frame sequence includes video frames obtained by downsampling video frames in the to-be-encoded video that are not encoded into the first bitstream; and outputting the first bitstream and the second bitstream.

In some possible implementations, the encoding the to-be-encoded video to obtain a first bitstream and a second bitstream includes: performing frame skipping and encoding on the to-be-encoded video to obtain the first bitstream; reconstructing the first bitstream to obtain a third frame sequence; downsampling video frames in the third frame sequence to obtain the first frame sequence; downsampling the video frames in the to-be-encoded video that are not encoded into the first bitstream, to obtain the second frame sequence; and encoding the video frames in the second frame sequence by using the video frames in the first frame sequence as the key frames, to obtain the second bitstream.

According to a second aspect, this application provides a video decoding method. The method includes: obtaining a first bitstream and a second bitstream, where the first bitstream is a bitstream obtained by performing frame skipping and encoding on a source video, the second bitstream is a bitstream obtained by encoding video frames in a second frame sequence by using video frames in a first frame sequence as key frames, the first frame sequence includes video frames obtained by downsampling video frames in the source video that are encoded into the first bitstream, and the second frame sequence includes video frames obtained by downsampling video frames in the source video that are not encoded into the first bitstream; and determining a target video based on the first bitstream and the second bitstream, where the target video includes content expressed in the source video.

In some possible implementations, the determining a target video based on the first bitstream and the second bitstream includes: decoding the first bitstream to obtain the third frame sequence; downsampling video frames in the third frame sequence to obtain the first frame sequence; decoding the second bitstream by using the video frames in the first frame sequence as the key frames, to obtain the second frame sequence; and determining the target video based on the second frame sequence and the third frame sequence.

In some possible implementations, the determining the target video based on the second frame sequence and the third frame sequence includes: determining an initial motion vector field of a to-be-processed frame in the second frame sequence based on the to-be-processed frame and the first frame sequence; upsampling the initial motion vector field to obtain a to-be-processed motion vector field of the to-be-processed frame; and determining a to-be-interpolated frame based on the to-be-processed motion vector field and a reference frame in the third frame sequence, where the target video includes the to-be-interpolated frame.

In some possible implementations, the determining a to-be-interpolated frame based on the to-be-processed motion vector field and a reference frame in the third frame sequence includes: performing a bilinear interpolation operation based on the to-be-processed motion vector field and the reference frame in the third frame sequence to obtain the to-be-interpolated frame.

In some possible implementations, the method further includes: determining illumination change information between the to-be-processed frame and a sampled video frame based on the to-be-processed frame and the sampled video frame, where the sampled video frame is in the first frame sequence and is obtained by downsampling the reference frame. The determining a to-be-interpolated frame based on the to-be-processed motion vector field and a reference frame in the third frame sequence includes: determining the to-be-interpolated frame based on the illumination change information, the to-be-processed motion vector field, and the reference frame.

In some possible implementations, the determining the to-be-interpolated frame based on the illumination change information, the to-be-processed motion vector field, and the reference frame includes: performing illumination change processing on the reference frame based on the illumination change information to obtain a target reference frame; and determining the to-be-interpolated frame based on the to-be-processed motion vector field and the target reference frame.

In some possible implementations, the method further includes: determining scene switching information between the to-be-processed frame and a sampled video frame based on the to-be-processed frame and the sampled video frame, where the sampled video frame is in the first frame sequence and is obtained by sampling the reference frame. The determining a to-be-interpolated frame based on the to-be-processed motion vector field and a reference frame in the third frame sequence includes: determining the to-be-interpolated frame based on the scene switching information, the to-be-processed motion vector field, and the reference frame.

In some possible implementations, the reference frame includes a forward reference frame and a backward reference frame, and the sampled video frame includes a forward sampled video frame and a backward sampled video frame. The determining the to-be-interpolated frame based on the scene switching information, the to-be-processed motion vector field, and the reference frame includes: when it is determined, based on the scene switching information, that a mode of switching from the to-be-processed frame to the forward sampled video frame is a hard switching mode, determining the to-be-interpolated frame based on the to-be-processed motion vector field and the backward reference frame; and when it is determined, based on the scene switching information, that a mode of switching from the to-be-processed frame to the backward sampled video frame is a hard switching mode, determining the to-be-interpolated frame based on the to-be-processed motion vector field and the forward reference frame.

In some possible implementations, the determining the to-be-interpolated frame based on the scene switching information, the to-be-processed motion vector field, and the reference frame includes: when it is determined, based on the scene switching information, that a mode of switching from the to-be-processed frame to the reference frame is a fade-in/fade-out mode, determining the to-be-interpolated frame based on the to-be-processed motion vector field, a preset luminance coefficient, and the reference frame.

According to a third aspect, an embodiment of this application provides a video encoding apparatus, including several functional units, for example, implemented on processing circuits or processors, configured to implement any method in the first aspect. In the below description of the apparatus, the term "module" may refer to a piece of hardware, or software, or hardware with software installed.

For example, the video encoding apparatus may include an obtaining module, an encoding module, and an output module. The obtaining module is configured to obtain a to-be-encoded video. The encoding module is configured to encode the to-be-encoded video to obtain a first bitstream and a second bitstream. The first bitstream is a bitstream obtained by performing frame skipping and encoding on the to-be-encoded video, the second bitstream is a bitstream obtained by encoding video frames in a second frame sequence by using video frames in a first frame sequence as key frames, the first frame sequence includes video frames obtained by downsampling video frames in the to-be-encoded video that are encoded into the first bitstream, and the second frame sequence includes video frames obtained by downsampling video frames in the to-be-encoded video that are not encoded into the first bitstream. The output module is configured to output the first bitstream and the second bitstream.

In some possible implementations, the encoding module is configured to: perform frame skipping and encoding on the to-be-encoded video to obtain the first bitstream; reconstruct the first bitstream to obtain a third frame sequence; downsample video frames in the third frame sequence to obtain the first frame sequence; downsample the video frames in the to-be-encoded video that are not encoded into the first bitstream, to obtain the second frame sequence; and encode the video frames in the second frame sequence by using the video frames in the first frame sequence as the key frames, to obtain the second bitstream.

According to a fourth aspect, an embodiment of this application provides a video decoding apparatus, including several functional units configured to implement any method in the second aspect.

For example, the video decoding apparatus may include an obtaining module and a decoding module. The obtaining module is configured to obtain a first bitstream and a second bitstream. The first bitstream is a bitstream obtained by performing frame skipping and encoding on a source video, the second bitstream is a bitstream obtained by encoding video frames in a second frame sequence by using video frames in a first frame sequence as key frames, the first frame sequence includes video frames obtained by downsampling video frames in the source video that are encoded into the first bitstream, and the second frame sequence includes video frames obtained by downsampling video frames in the source video that are not encoded into the first bitstream. The decoding module is configured to determine a target video based on the first bitstream and the second bitstream. The target video includes content expressed in the source video.

In some possible implementations, the decoding module is configured to: decode the first bitstream to obtain the third frame sequence; downsample video frames in the third frame sequence to obtain the first frame sequence; decode the second bitstream by using the video frames in the first frame sequence as the key frames, to obtain the second frame sequence; and determine the target video based on the first bitstream and the second bitstream.

In some possible implementations, the decoding module is configured to: determine an initial motion vector field of a to-be-processed frame in the second frame sequence based on the to-be-processed frame and the first frame sequence; upsample the initial motion vector field to obtain a to-be-processed motion vector field of the to-be-processed frame; and determine a to-be-interpolated frame based on the to-be-processed motion vector field and a reference frame in the third frame sequence, where the target video includes the to-be-interpolated frame.

In some possible implementations, the decoding module is configured to perform a bilinear interpolation operation based on the to-be-processed motion vector field and the reference frame in the third frame sequence to obtain the to-be-interpolated frame.

In some possible implementations, the apparatus further includes: a determining module, configured to determine illumination change information between the to-be-processed frame and a sampled video frame based on the to-be-processed frame and the sampled video frame, where the sampled video frame is in the first frame sequence and is obtained by downsampling the reference frame. The decoding module is configured to determine the to-be-interpolated frame based on the illumination change information, the to-be-processed motion vector field, and the reference frame.

In some possible implementations, the decoding module is configured to: perform illumination change processing on the reference frame based on the illumination change information to obtain a target reference frame; and determine the to-be-interpolated frame based on the to-be-processed motion vector field and the target reference frame.

In some possible implementations, the apparatus further includes: a determining module, configured to determine scene switching information between the to-be-processed frame and a sampled video frame based on the to-be-processed frame and the sampled video frame, where the sampled video frame is in the first frame sequence and is obtained by sampling the reference frame. The decoding module is configured to determine the to-be-interpolated frame based on the scene switching information, the to-be-processed motion vector field, and the reference frame.

In some possible implementations, the reference frame includes a forward reference frame and a backward reference frame, and the sampled video frame includes a forward sampled video frame and a backward sampled video frame. The decoding module is configured to: when it is determined, based on the scene switching information, that a mode of switching from the to-be-processed frame to the forward sampled video frame is a hard switching mode, determine the to-be-interpolated frame based on the to-be-processed motion vector field and the backward reference frame; and when it is determined, based on the scene switching information, that a mode of switching from the to-be-processed frame to the backward sampled video frame is a hard switching mode, determine the to-be-interpolated frame based on the to-be-processed motion vector field and the forward reference frame.

In some possible implementations, the decoding module is configured to: when it is determined, based on the scene switching information, that a mode of switching from the to-be-processed frame to the reference frame is a fade-in/fade-out mode, determine the to-be-interpolated frame based on the to-be-processed motion vector field, a preset luminance coefficient, and the reference frame.

According to a fifth aspect, this application provides an encoding apparatus, including a nonvolatile memory and a processor that are coupled to each other. The processor invokes program code stored in the memory to perform a part or all of the steps of any method in the first aspect.

The apparatus may be a chip, or may be an encoding device.

According to a sixth aspect, this application provides a decoding apparatus, including a memory and a processor that are coupled to each other. The processor invokes program code stored in the memory to perform a part or all of the steps of any method in the second aspect.

The apparatus may be a chip, or may be a decoding device.

According to a seventh aspect, this application provides a computer-readable storage medium. The computer-readable storage medium may be non-transitory and tores instructions, and the instructions are for implementing any method in the first aspect.

According to an eighth aspect, this application provides a computer-readable storage medium. The computer-readable storage medium stores instructions, and the instructions are for implementing any method in the second aspect.

According to a ninth aspect, an embodiment of this application provides a computer program product. When the computer program product is run on a computer, the computer is enabled to perform a part or all of the steps of any method in the first aspect.

According to a tenth aspect, an embodiment of this application provides a computer program product. When the computer program product is run on a computer, the computer is enabled to perform a part or all of the steps of any method in the second aspect.

In the video encoding method provided in this application, when encoding is performed by using a frame skipping method to obtain the first bitstream corresponding to the to-be-encoded video, the second bitstream corresponding to video frames skipped during frame skipping and encoding is further obtained. In addition, the second bitstream is obtained by encoding frames obtained by downsampling video frames other than the first bitstream by using the video frames in the first bitstream as the key frames. Therefore, when the decoder side performs decoding based on the first bitstream and the second bitstream to restore the to-be-encoded video frames, in addition to obtaining the corresponding video frames based on the first bitstream, the decoder side may predict, based on the second bitstream, video frames between video frames corresponding to the first bitstream. In this way, accuracy of predicted video frames can be improved, thereby improving coding performance.

In addition, because the second bitstream is obtained by encoding frames that are obtained by downsampling the video frames other than the first bitstream, the bit rate may be further reduced.

BRIEF DESCRIPTION OF DRAWINGS

FIG. 10 is a schematic flowchart of a video decoding method according to an embodiment of this application;

FIG. 11 is a schematic diagram of a reference relationship between video frames on which video decoding is performed according to an embodiment of this application;

FIG. 12 is a schematic diagram of a structure of a video encoding apparatus according to an embodiment of this application;

DESCRIPTION OF EMBODIMENTS

Figure 1:
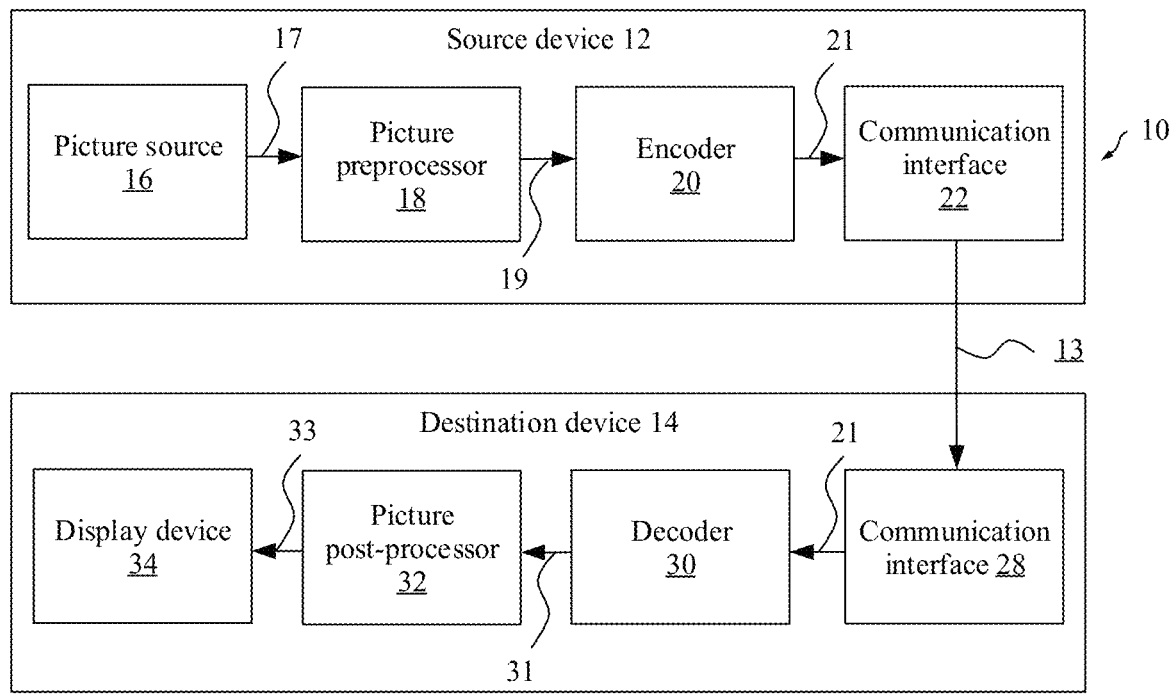
FIG. 1 is a schematic block diagram of a video encoding and decoding system according to an embodiment of this application.

The following describes embodiments of this application with reference to the accompanying drawings in embodiments of this application. In the following description, reference is made to the accompanying drawings, which form a part of this disclosure and show, by way of illustration, specific aspects of embodiments of this application or specific aspects in which embodiments of this application may be used. It should be understood that embodiments of this application may be used in other aspects, and may include structural or logical changes not depicted in the accompanying drawings. Therefore, the following detailed descriptions shall not be understood in a limiting sense, and the scope of this application is defined by the appended claims. For example, it should be understood that the disclosure with reference to the described method may also be applied to a corresponding device or system for performing the method, and vice versa. For example, if one or more method steps are described, a corresponding device may include one or more units such as functional units for performing the described one or more method steps (for example, one unit performs the one or more steps; or a plurality of units, each of which performs one or more of the plurality of steps), even if such one or more units are not explicitly described or illustrated in the accompanying drawings. In addition, for example, if an apparatus is described based on one or more units such as a functional unit, a corresponding method may include one step for implementing functionality of one or more units (for example, one step for implementing functionality of one or more units; or a plurality of steps, each of which is for implementing functionality of one or more units in a plurality of units), even if such one or more of steps are not explicitly described or illustrated in the accompanying drawings. Further, it should be understood that features of various example embodiments and/or aspects described in this specification may be combined with each other, unless otherwise specified.

The technical solutions in embodiments of this application are not only applicable to existing video coding standards (for example, standards such as H.264 and HEVC), but also applicable to a future video coding standard (for example, the H.266 standard). Terms used in embodiments of this application are only used for explaining embodiments of this application, but are not intended to limit this application. The following first briefly describes related concepts in embodiments of this application.

Video coding usually refers to processing of a sequence of pictures, where the sequence of pictures forms a video or a video sequence. In the field of video coding, the terms "picture (picture)", "frame (frame)", or "image (image)" may be used as synonyms. Video coding used in this specification indicates video encoding or video decoding. Video encoding is performed on a source side, and usually includes processing (for example, by compression) original video pictures to reduce an amount of data for representing the video pictures for more efficient storage and/or transmission. Video decoding is performed on a destination side, and usually includes inverse processing relative to an encoder, to reconstruct video pictures. Video picture "coding" in embodiments shall be understood as "encoding" or "decoding" for a video sequence. A combination of an encoding part and a decoding part is also referred to as coding (encoding and decoding).

A video sequence includes a series of images (picture), an image is further split into slices (slice), and a slice is further split into blocks. In video coding, coding processing is performed per block. In some new video coding standards, a concept "block" is further extended. For example, in the H.264 standard, there is a macroblock (MB), and the macroblock may be further split into a plurality of prediction blocks (partition) that can be used for predictive coding. In the high efficiency video coding (HEVC) standard, a plurality of block units are obtained through classification based on functions by using basic concepts such as a coding unit (CU), a prediction unit (PU), and a transform unit (TU), and are described by using a new tree-based structure. For example, a CU may be split into smaller CUs based on a quadtree, and a smaller CU may continue to be split to generate a quadtree structure. The CU is a basic unit for splitting and coding a to-be-coded image. A PU and a TU also have a similar tree structure. The PU may correspond to a prediction block and is a basic unit of predictive coding. The CU is further split into a plurality of PUs in a split mode. The TU may correspond to a transform block, and is a basic unit for transforming a prediction residual. However, in essence, the CU, the PU, and the TU are conceptually blocks (or image blocks).

For example, in HEVC, a CTU is split into a plurality of CUs by using a quadtree structure represented as a coding tree. A decision on whether to code a picture area using inter-picture (temporal) or intra-picture (spatial) prediction is made at a CU level. Each CU may be further split into one, two, or four PUs based on a PU splitting type. Inside one PU, a same prediction process is applied, and related information is transmitted to a decoder on a PU basis. After a residual block is obtained by applying the prediction process based on the PU splitting type, the CU may be split into transform units (TU) based on another quadtree structure similar to the coding tree used for the CU. In the recent development of video compression technologies, a quadtree plus binary tree (QTBT) partition frame is used for partitioning a coding block. In a QTBT block structure, a CU may have a square or rectangular shape.

In this specification, for ease of description and understanding, an image block to be coded in a current coded image may be referred to as a current block. For example, during encoding, the current block is a current encoding block. During decoding, the current block is a current decoding block. A decoded image block that is in a reference image and that is used for predicting the current block is referred to as a reference block. In other words, the reference block is a block that provides a reference signal for the current block, where the reference signal indicates a pixel value in the image block. A block that is in the reference image and that provides a prediction signal for the current block may be referred to as a prediction block. The prediction signal indicates a pixel value, a sampling value, or a sampling signal in the prediction block. For example, an optimal reference block is found after a plurality of reference blocks are traversed, the optimal reference block provides prediction for the current block, and this block is referred to as a prediction block.

In a case of lossless video coding, original video pictures can be reconstructed. In other words, reconstructed video pictures have the same quality as the original video pictures (assuming that no transmission loss or other data loss occurs during storage or transmission). In a case of lossy video coding, further compression is performed through, for example, quantization, to reduce an amount of data required for representing video pictures, and the video pictures cannot be completely reconstructed on a decoder side. In other words, quality of reconstructed video pictures is lower or poorer than that of the original video pictures.

Several H.261 video coding standards are for "lossy hybrid video codecs" (in other words, spatial and temporal prediction in a sample domain is combined with 2D transform coding for applying quantization in a transform domain). Each picture of a video sequence is usually split into a set of non-overlapping blocks, and coding is usually performed at a block level. In other words, on an encoder side, a video is typically processed, that is, encoded, at a block (video block) level, for example, using spatial (intra-picture) prediction and/or temporal (inter-picture) prediction to generate a prediction block, subtracting the prediction block from a current block (a block that is currently being processed or to be processed) to obtain a residual block, and transforming the residual block and quantizing the residual block in the transform domain to reduce the amount of data to be transmitted (compressed), whereas on a decoder side, an inverse processing in comparison with the processing of the encoder is applied to the encoded or compressed block to reconstruct the current block for representation. Furthermore, the encoder duplicates a decoder processing loop, so that the encoder and the decoder generate same prediction (for example, intra predictions and inter predictions) and/or reconstruction, for processing, that is, for coding subsequent blocks.

The following describes a system architecture used in embodiments of this application. FIG. 1 is a schematic block diagram of an example of a video encoding and decoding system 10 according to an embodiment of this application. As shown in FIG. 1, the video encoding and decoding system 10 may include a source device 12 and a destination device 14. The source device 12 generates encoded video data, therefore, the source device 12 may be referred to as a video encoding apparatus. The destination device 14 may decode the encoded video data generated by the source device 12, therefore, the destination device 14 may be referred to as a video decoding apparatus. The source device 12, the destination device 14, or various implementation solutions of the source device 12 or the destination device 14 may include one or more processors and a memory coupled to the one or more processors. The memory may include but is not limited to a RAM, a ROM, an EEPROM, a flash memory, or any other medium that can be used for storing desired program code in a form of an instruction or a data structure accessible to a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a "smart" phone, a television, a camera, a display apparatus, a digital media player, a video game console, an in-vehicle computer, a wireless communication device, or the like.

Although FIG. 1 depicts the source device 12 and the destination device 14 as separate devices, a device embodiment may alternatively include both the source device 12 and the destination device 14 or the functionalities of both the source device 12 and the destination device 14, that is, the source device 12 or corresponding functionality, and the destination device 14 or corresponding functionality. In such embodiments, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented through a link 13, and the destination device 14 may receive encoded video data from the source device 12 through the link 13. The link 13 may include one or more media or apparatuses capable of moving the encoded video data from the source device 12 to the destination device 14. In an example, the link 13 may include one or more communication media that enable the source device 12 to transmit the encoded video data directly to the destination device 14 in real time. In this example, the source device 12 may modulate the encoded video data according to a communications standard (for example, a wireless communication protocol), and may transmit modulated video data to the destination device 14. The one or more communication media may include a wireless and/or wired communication medium, for example, a radio frequency (RF) spectrum or one or more physical transmission lines. The one or more communication media may constitute a part of a packet-based network, and the packet-based network is, for example, a local area network, a wide area network, or a global network (for example, the Internet). The one or more communication media may include a router, a switch, a base station, or another device that facilitates communication from the source device 12 to the destination device 14.

The source device 12 includes an encoder 20, and optionally, the source device 12 may further include a picture source 16, a picture preprocessor 18, and a communication interface 22. In a specific implementation form, the encoder 20, the picture source 16, the picture preprocessor 18, and the communication interface 22 may be hardware components in the source device 12, or may be software programs in the source device 12. Descriptions are separately provided as follows.

The picture source 16 may include or be any type of picture capture device configured to, for example, capture a real-world picture; and/or any type of device for generating a picture or comment (for screen content encoding, some text on a screen is also considered as a part of a to-be-encoded picture or image), for example, a computer graphics processing unit configured to generate a computer animation picture; and/or any type of device for obtaining and/or providing a real-world picture or a computer animation picture (for example, screen content or a virtual reality (VR)

picture); and/or any combination thereof (for example, an augmented reality (AR) picture). The picture source 16 may be a camera configured to capture a picture or a memory configured to store a picture. The picture source 16 may further include any type of (internal or external) interface through which a previously captured or generated picture is stored and/or a picture is obtained or received. When the picture source 16 is a camera, the picture source 16 may be, for example, a local camera or an integrated camera integrated into the source device. When the picture source 16 is a memory, the picture source 16 may be a local memory or, for example, an integrated memory integrated into the source device. When the picture source 16 includes an interface, the interface may be, for example, an external interface for receiving a picture from an external video source. The external video source is, for example, an external picture capturing device such as a camera, an external memory, or an external picture generation device. The external picture generation device is, for example, an external computer graphics processing unit, a computer, or a server. The interface may be any type of interface, for example, a wired or wireless interface or an optical interface, according to any proprietary or standardized interface protocol.

A picture may be considered as a two-dimensional array or matrix of pixels (picture element). A pixel in the array may also be referred to as a sample. A quantity of samples in horizontal and vertical directions (or axes) of the array or the picture defines a size and/or resolution of the picture. For representation of a color, three color components are usually employed. To be specific, the picture may be represented as or include three sample arrays. For example, in an RBG format or color space, a picture includes a corresponding red, green, and blue sample array. However, in video coding, each sample is usually represented in a luminance/chrominance format or color space. For example, a picture in a YUV format includes a luminance component indicated by Y (or sometimes L) and two chrominance components indicated by U and V. The luminance (luma) component Y represents luminance or gray level intensity (for example, both are the same in a gray-scale picture), and the two chrominance (chroma) components U and V represent chrominance or color information components. Accordingly, the picture in the YUV format includes a luminance sample array of luminance sample values (Y) and two chrominance sample arrays of chrominance values (U and V). Pictures in the RGB format may be transformed or converted to pictures in the YUV format and vice versa. This process is also referred to as color conversion or transform. If a picture is monochrome, the picture may include only a luminance sample array. In embodiments of this application, a picture transmitted by the picture source 16 to the picture processor may also be referred to as raw picture data 17.

The picture preprocessor 18 is configured to receive the raw picture data 17 and preprocess the raw picture data 17 to obtain a preprocessed picture 19 or preprocessed picture data 19. For example, the preprocessing performed by the picture preprocessor 18 may include trimming, color format transformation (for example, from the RGB format to the YUV format), color correction, or denoising.

The encoder 20 (also referred to as a video encoder 20) is configured to receive the preprocessed picture data 19 and process the preprocessed picture data 19 in a related prediction mode (such as a prediction mode in embodiments of this specification), to provide encoded picture data 21 (structural details of the encoder 20 are further described below based on FIG. 2, FIG. 4, or FIG. 5). In some embodiments, the encoder 20 may be configured to implement various embodiments described below, to implement encoder-side application of a chrominance block prediction method described in this application.

The communication interface 22 may be configured to receive the encoded picture data 21 and transmit the encoded picture data 21 to the destination device 14 or any other device (for example, a memory) through the link 13 for storage or direct reconstruction. The other device may be any device configured for decoding or storage. The communication interface 22 may be, for example, configured to encapsulate the encoded picture data 21 into an appropriate format, for example, a data packet, for transmission over the link 13.

The destination device 14 includes a decoder 30. Optionally, the destination device 14 may further include a communication interface 28, a picture post-processor 32, and a display device 34. Descriptions are separately provided as follows.

The communication interface 28 may be configured to receive the encoded picture data 21 from the source device 12 or any other source. The any other source is, for example, a storage device. The storage device is, for example, an encoded picture data storage device. The communication interface 28 may be configured to transmit or receive the encoded picture data 21 through the link 13 between the source device 12 and the destination device 14 or through any type of network. The link 13 is, for example, a direct wired or wireless connection, and the any type of network is, for example, a wired or wireless network or any combination thereof, or any type of private or public network, or any combination thereof. The communication interface 28 may be, for example, configured to decapsulate the data packet transmitted through the communication interface 22, to obtain the encoded picture data 21.

Both the communication interface 28 and the communication interface 22 may be configured as unidirectional communication interfaces or bidirectional communication interfaces, and may be configured to, for example, send and receive messages to establish a connection, and acknowledge and exchange any other information related to a communication link and/or data transmission such as encoded picture data transmission.

The decoder 30 (also referred to as a decoder 30) is configured to receive the encoded picture data 21 and provide decoded picture data 31 or a decoded picture 31 (structural details of the decoder 30 are further described below based on FIG. 3, FIG. 4, or FIG. 5). In some embodiments, the decoder 30 may be configured to implement various embodiments described below, to implement decoder-side application of a chrominance block prediction method described in this application.

The picture post-processor 32 is configured to post-process the decoded picture data 31 (also referred to as reconstructed picture data) to obtain post-processed picture data 33. The post-processing performed by the picture post-processor 32 may include color format transformation (for example, from a YUV format to an RGB format), color correction, trimming, re-sampling, or any other processing. The picture post-processor 32 may be further configured to transmit the post-processed picture data 33 to the display device 34.

The display device 34 is configured to receive the post-processed picture data 33 to display a picture, for example, to a user or a viewer. The display device 34 may be or include any type of display configured to present a reconstructed picture, for example, an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any type of other display.

Although FIG. 1 depicts the source device 12 and the destination device 14 as separate devices, a device embodiment may alternatively include both the source device 12 and the destination device 14 or functionality of both the source device 12 and the destination device 14, that is, the source device 12 or corresponding functionality, and the destination device 14 or corresponding functionality. In such embodiments, the source device 12 or the corresponding functionality and the destination device 14 or the corresponding functionality may be implemented by using same hardware and/or software, separate hardware and/or software, or any combination thereof.

As will be apparent for a person skilled in the art based on the descriptions, existence and (exact) split of functionality of the different units or functionality of the source device 12 and/or the destination device 14 shown in FIG. 1 may vary depending on an actual device and application. The source device 12 and the destination device 14 may include any one of a wide range of devices, including any type of handheld or stationary device, for example, a notebook or laptop computer, a mobile phone, a smartphone, a pad or a tablet computer, a video camera, a desktop computer, a set-top box, a television set, a camera, an in-vehicle device, a display device, a digital media player, a video game console, a video streaming transmission device (such as a content service server or a content distribution server), a broadcast receiver device, and a broadcast transmitter device, and may not use or may use any type of operating system.

The encoder 20 and the decoder 30 each may be implemented as any one of various appropriate circuits, for example, one or more microprocessors, digital signal processors (digital signal processor, DSP), application-specific integrated circuits (ASIC), field-programmable gate arrays (FPGA), discrete logic, hardware, or any combinations thereof. If the technologies are implemented partially by using software, a device may store software instructions in an appropriate and non-transitory computer-readable storage medium and may execute instructions by using hardware such as one or more processors, to perform the technologies of this disclosure. Any one of the foregoing content (including hardware, software, a combination of hardware and software, and the like) may be considered as one or more processors.

In some cases, the video encoding and decoding system 10 shown in FIG. 1 is merely an example, and the technologies of this application are applicable to video coding settings (for example, video encoding or video decoding) that do not necessarily include any data communication between an encoding device and a decoding device. In other examples, data may be retrieved from a local memory, streamed over a network, or the like. A video encoding device may encode the data and store the data into a memory, and/or a video decoding device may retrieve the data from the memory and decode the data. In some examples, encoding and decoding are performed by devices that do not communicate with each other but simply encode data to a memory and/or retrieve the data from the memory and decode the data.

Figure 2:
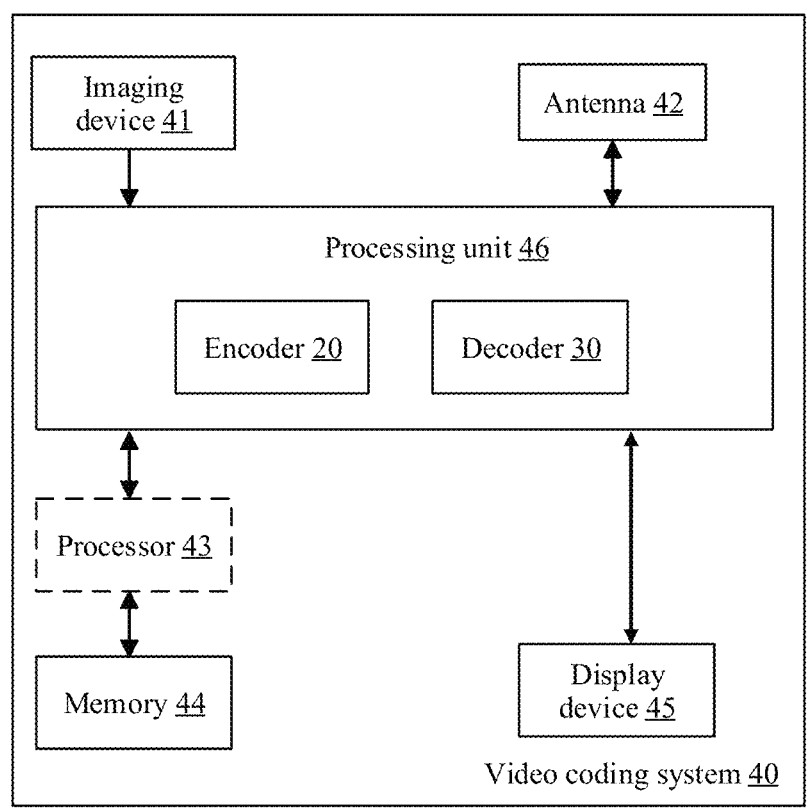
FIG. 2 is a schematic block diagram of a video coding system according to an embodiment of this application.
Figure 3:
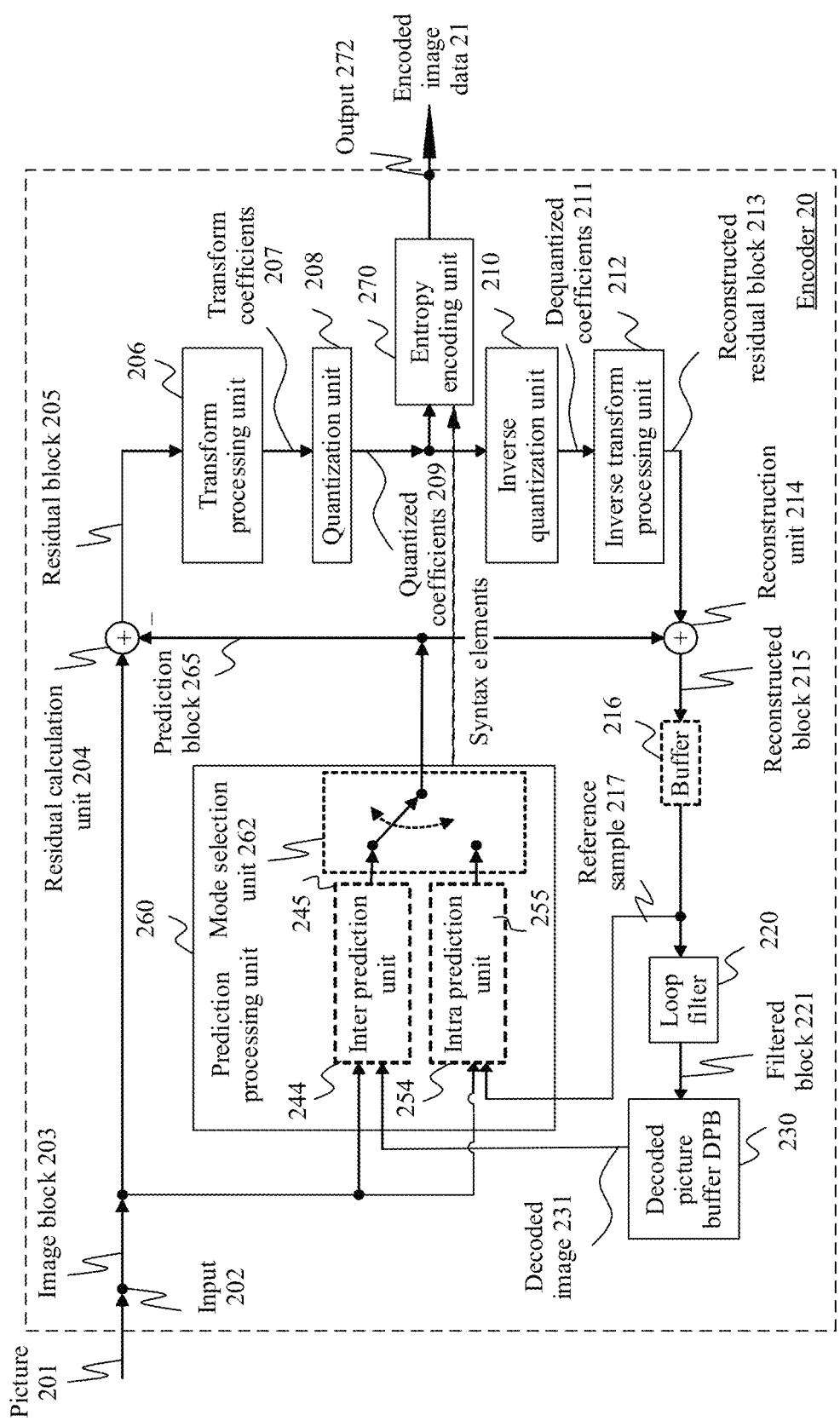
FIG. 3 is a schematic diagram of a structure of an encoder according to an embodiment of this application.
Figure 4:
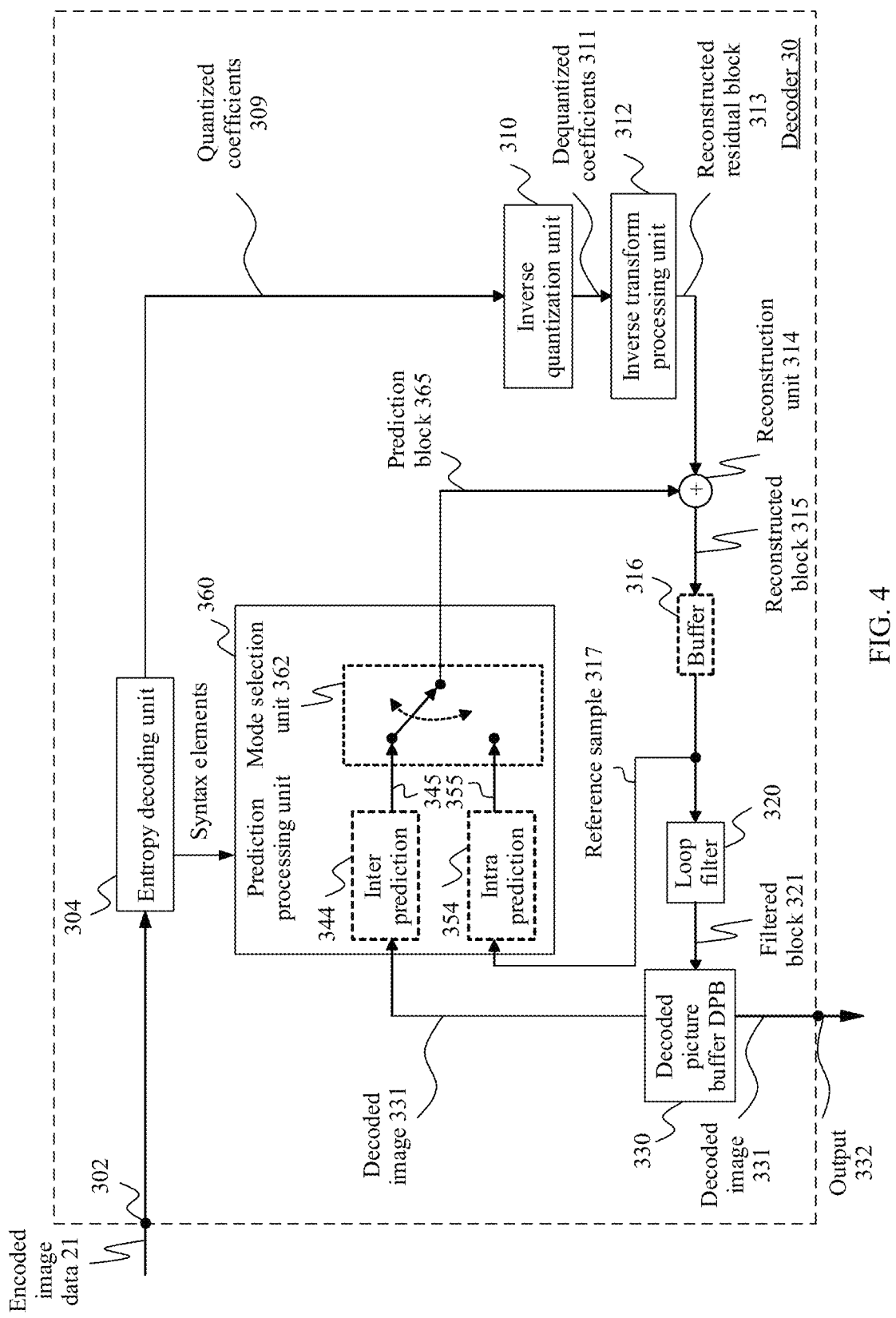
FIG. 4 is a schematic diagram of a structure of a decoder according to an embodiment of this application.

FIG. 2 is an illustrative diagram of an example of a video coding system 40 including an encoder 20 in FIG. 3 and/or a decoder 30 in FIG. 4 according to an example embodiment. The video coding system 40 can implement a combination of various technologies in embodiments of this application. In the illustrated implementation, the video coding system 40 may include an imaging device 41, the encoder 20, the decoder 30 (and/or a video encoder/decoder implemented by using a logic circuit 47 of a processing unit 46), an antenna 42, one or more processors 43, one or more memories 44, and/or a display device 45.

As shown in FIG. 2, the imaging device 41, the antenna 42, the processing unit, e.g., made of circuit or circuits, 46, the logic circuit 47, the encoder 20, the decoder 30, the processor 43, the memory 44, and/or the display device 45 can communicate with each other. As described, although the video coding system 40 is illustrated with the encoder 20 and the decoder 30, the video coding system 40 may include only the encoder 20 or only the decoder 30 in different examples.

In some examples, the antenna 42 may be configured to transmit or receive an encoded bitstream of video data. Further, in some examples, the display device 45 may be configured to present the video data. In some examples, the logic circuit 47 may be implemented by the processing unit 46. The processing unit 46 may include application-specific integrated circuit (ASIC) logic, a graphics processing unit, a general-purpose processor, or the like. The video coding system 40 may also include the optional processor 43. The optional processor 43 may similarly include application-specific integrated circuit (ASIC) logic, a graphics processing unit, a general-purpose processor, or the like. In some examples, the logic circuit 47 may be implemented by hardware, for example, video coding dedicated hardware, and the processor 43 may be implemented by general-purpose software, an operating system, or the like. In addition, the memory 44 may be any type of memory, for example, a volatile memory (for example, a static random access memory (SRAM) or a dynamic random access memory (DRAM)) or a non-volatile memory (for example, a flash memory). In a non-limiting example, the memory 44 may be implemented by a cache. In some examples, the logic circuit 47 may access the memory 44 (for example, for implementation of the image buffer). In other examples, the logic circuit 47 and/or the processing unit 46 may include a memory (for example, a cache) for implementation of a picture buffer or the like.

In some examples, the encoder 20 implemented by the logic circuit may include a picture buffer (for example, implemented by the processing unit 46 or the memory 44) and a graphics processing unit (for example, implemented by the processing unit 46). The graphics processing unit may be communicatively coupled to the picture buffer. The graphics processing unit may include the encoder 20 implemented by using the logic circuit 47, to implement various modules described with reference to FIG. 3 and/or any other encoder system or subsystem described in this specification. The logic circuit may be configured to perform various operations described in this specification.

In some examples, the decoder 30 may be implemented by using the logic circuit 47 in a similar manner, to implement various modules described with reference to the decoder 30 in FIG. 4 and/or any other decoder system or subsystem described in this specification. In some examples, the decoder 30 implemented by the logic circuit may include a picture buffer (implemented by the processing unit 2820 or the memory 44) and a graphics processing unit (for example, implemented by the processing unit 46). The graphics processing unit may be communicatively coupled to the picture buffer. The graphics processing unit may include the decoder 30 implemented by using the logic circuit 47, to implement various modules described with reference to FIG. 4 and/or any other decoder system or subsystem described in this specification.

In some examples, the antenna 42 may be configured to receive an encoded bitstream of video data. As described, the encoded bitstream may include data, an indicator, an index value, mode selection data, or the like related to video frame encoding described in this specification, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that, in embodiments of this application, for the example described with reference to the encoder 20, the decoder 30 may be configured to perform an inverse process. With regard to signaling a syntax element, the decoder 30 may be configured to receive and parse such a syntax element and correspondingly decode related video data. In some examples, the encoder 20 may entropy encode the syntax element into an encoded video bitstream. In such examples, the decoder 30 may parse such a syntax element and correspondingly decode related video data.

It should be noted that the video encoding method described in embodiments of this application is mainly applied to an encoding process, and this process exists in the encoder 20. The video decoding method described in embodiments of this application can applied to an inter prediction process, and this process exists in the decoder 30. The encoder 20 and the decoder 30 in embodiments of this application may be an encoder/a decoder corresponding to video standard protocols such as H.263, H.264, HEVV, MPEG-2, MPEG-4, VP8 and VP9 or next-generation video standard protocols (such as H.266).

FIG. 3 is a schematic/conceptual block diagram of an example of an encoder 20 according to an embodiment of this application. In the example of FIG. 3, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the diagram). The encoder 20 shown in FIG. 3 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, and the prediction processing unit 260 form a backward signal path of the encoder. The backward signal path of the encoder corresponds to a signal path of a decoder (refer to a decoder 30 in FIG. 4).

The encoder 20 receives, for example, by using an input 202, a picture 201 or an image block 203 of the picture 201, for example, a picture in a sequence of pictures forming a video or a video sequence. The image block 203 may also be referred to as a current picture block or a to-be-encoded picture block, and the picture 201 may be referred to as a current picture or a to-be-encoded picture (particularly in video coding, to distinguish the current picture from other pictures, the other pictures are, for example, previously encoded and/or decoded pictures in a same video sequence, that is, the video sequence that also includes the current picture).

In an embodiment, the encoder 20 may include a partitioning unit (not shown in FIG. 3), configured to partition the picture 201 into a plurality of blocks such as image blocks 203. The picture 201 is usually partitioned into a plurality of non-overlapping blocks. The partitioning unit may be configured to use a same block size for all pictures in a video sequence and a corresponding grid defining the block size, or change a block size between pictures or subsets or picture groups and partition each picture into corresponding blocks.

In one example, the prediction processing unit 260 of the encoder 20 may be configured to perform any combination of the partitioning technologies described above.

Like the picture 201, the image block 203 is also or may be considered as a two-dimensional array or matrix of samples with sample values, although of a smaller size than the picture 201. In other words, the image block 203 may include, for example, one sample array (for example, a luminance array in a case of a monochrome picture 201), three sample arrays (for example, one luminance array and two chrominance arrays in a case of a color picture), or any other quantity and/or type of arrays depending on an applied color format. A quantity of samples in horizontal and vertical directions (or axes) of the image block 203 defines a size of the image block 203.

The encoder 20 shown in FIG. 3 is configured to encode the picture 201 block by block, for example, perform encoding and prediction on each image block 203.

The residual calculation unit 204 is configured to calculate a residual block 205 based on the image block 203 of the picture and a prediction block 265 (further details about the prediction block 265 are provided below), for example, obtain the residual block 205 in a sample domain by subtracting sample values of the prediction block 265 from sample values of the image block 203 sample by sample (pixel by pixel).

The transform processing unit 206 is configured to apply a transform, for example, a discrete cosine transform (DCT) or a discrete sine transform (DST), to sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as transforms specified in HEVC/H.265. Compared with an orthogonal DCT transform, such integer approximations are usually scaled by a factor. To preserve a norm of a residual block which is processed by using forward and inverse transforms, applying an additional scale factor is a part of a transform process. The scale factor is usually chosen based on some constraints, for example, the scale factor being a power of two for a shift operation, a bit depth of the transform coefficient, or a tradeoff between accuracy and implementation costs. A specific scaling factor is, for example, specified for an inverse transform, for example, by the inverse transform processing unit 212 on the decoder side 30 (and the corresponding inverse transform, for example, by the inverse transform processing unit 212 on the encoder side 20), and a corresponding scaling factor for the forward transform, for example, by the transform processing unit 206 on the encoder side 20 may be specified accordingly.

The quantization unit 208 is configured to quantize the transform coefficients 207 to obtain quantized transform coefficients 209, for example, by applying scalar quantization or vector quantization. The quantized transform coefficients 209 may also be referred to as quantized residual coefficients 209. A quantization process may reduce a bit depth related to a part or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step size corresponds to finer quantization, whereas a larger quantization step size corresponds to coarser quantization. An appropriate quantization step size may be indicated by a quantization parameter (QP). For example, the quantization parameter may be an index of a predefined set of appropriate quantization step sizes. For example, a smaller quantization parameter may correspond to finer quantization (a smaller quantization step size) and a larger quantization parameter may correspond to coarser quantization (a larger quantization step size), or vice versa. The quantization may include division by a quantization step size and corresponding quantization or inverse quantization, for example, performed through the inverse quantization 210, or may include multiplication by a quantization step size. Embodiments according to some standards such as HEVC may use a quantization parameter to determine the quantization step size. Generally, the quantization step size may be calculated based on a quantization parameter by using a fixed-point approximation of an equation including division. Additional scale factors may be introduced for quantization and dequantization, to restore the norm of the residual block, where the norm of the residual block may be modified because of a scale used in the fixed-point approximation of the equation for the quantization step size and the quantization parameter. In one example implementation, a scale of the inverse transform may be combined with a scale of dequantization. Alternatively, customized quantization tables may be used and signaled from an encoder to a decoder, for example, in a bitstream. The quantization is a lossy operation, where a larger quantization step size indicates a larger loss.

The inverse quantization unit 210 is configured to apply the inverse quantization of the quantization unit 208 to the quantized coefficients to obtain dequantized coefficients 211, for example, apply, based on or by using a same quantization step size as the quantization unit 208, the inverse of a quantization scheme applied by the quantization unit 208. The dequantized coefficients 211 may also be referred to as dequantized residual coefficients 211, and correspond, although usually different from the transform coefficients due to a loss caused by quantization, to the transform coefficients 207.

The inverse transform processing unit 212 is configured to apply the inverse transform of the transform applied by the transform processing unit 206, for example, an inverse discrete cosine transform (DCT) or an inverse discrete sine transform (DST), to obtain an inverse transform block 213 in the sample domain. The inverse transform block 213 may also be referred to as an inverse transform dequantized block 213 or an inverse transform residual block 213.

The reconstruction unit 214 (for example, a summer 214) is configured to add the inverse transform block 213 (that is, a reconstructed residual block 213) to the prediction block 265 to obtain a reconstructed block 215 in the sample domain, for example, by adding sample values of the reconstructed residual block 213 and the sample values of the prediction block 265.

Optionally, a buffer unit 216 (a "buffer" 216 for short), for example, a line buffer 216, is configured to buffer or store the reconstructed block 215 and a corresponding sample value, for example, for intra prediction. In other embodiments, the encoder may be configured to use unfiltered reconstructed blocks and/or corresponding sample values stored in the buffer unit 216 for any type of estimation and/or prediction, for example, intra prediction.

For example, in an embodiment, the encoder 20 may be configured so that the buffer unit 216 is not only used for storing the reconstructed block 215 for intra prediction 254, but also used for the loop filter unit 220 (which is not shown in FIG. 3), and/or so that, for example, the buffer unit 216 and the decoded picture buffer unit 230 form one buffer. In other embodiments, filtered blocks 221 and/or blocks or samples from the decoded picture buffer 230 (the blocks or samples are not shown in FIG. 3) are used as an input or a basis for intra prediction 254.

The loop filter unit 220 ("loop filter" 220 for short) is configured to filter the reconstructed block 215 to obtain a filtered block 221, to smooth pixel transitions or improve video quality. The loop filter unit 220 is intended to represent one or more loop filters including a de-blocking filter, a sample-adaptive offset (SAO) filter, and another filter, for example, a bilateral filter, an adaptive loop filter (ALF), a sharpening or smoothing filter, or a collaborative filter. Although the loop filter unit 220 is shown in FIG. 3 as an in-loop filter, the loop filter unit 220 may be implemented as a post-loop filter in other configurations. The filtered block 221 may also be referred to as a filtered reconstructed block 221. The decoded picture buffer 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (such as sample adaptive offset information), for example, directly or after entropy encoding performed by the entropy encoding unit 270 or any other entropy encoding unit, so that, for example, the decoder 30 can receive the same loop filter parameter and apply the same loop filter parameter to decoding.

The decoded picture buffer (DPB) 230 may be a reference picture memory that stores reference picture data for use in video data encoding by the encoder 20. The DPB 230 may be formed by any one of a variety of memory devices, such as a dynamic random access memory (DRAM) (including a synchronous DRAM (synchronous DRAM, SDRAM), a magnetoresistive RAM (magnetoresistive RAM, MRAM), and a resistive RAM (resistive RAM, RRAM)), or another type of memory devices. The DPB 230 and the buffer 216 may be provided by a same memory device or separate memory devices. In an example, the decoded picture buffer (DPB) 230 is configured to store the filtered block 221. The decoded picture buffer 230 may be further configured to store other previously filtered blocks, for example, previously reconstructed and filtered blocks 221, of the same current picture or of different pictures, for example, previously reconstructed pictures, and may provide complete previously reconstructed, that is, decoded, pictures (and corresponding reference blocks and samples) and/or a partially reconstructed current picture (and corresponding reference blocks and samples), for example, for inter prediction. In an example, if the reconstructed block 215 is reconstructed without in-loop filtering, the decoded picture buffer (DPB) 230 is configured to store the reconstructed block 215.

The prediction processing unit 260, also referred to as a block prediction processing unit 260, is configured to receive or obtain the image block 203 (a current image block 203 of the current picture 201) and reconstructed picture data, for example, reference samples of the same (current) picture from the buffer 216 and/or reference picture data 231 of one or more previously decoded pictures from the decoded picture buffer 230, and to process such data for prediction, that is, to provide the prediction block 265 that may be an inter prediction block 245 or an intra prediction block 255.

The mode selection unit 262 may be configured to select a prediction mode (for example, an intra or inter prediction mode) and/or a corresponding prediction block 245 or 255 to be used as the prediction block 265, for calculation of the residual block 205 and for reconstruction of the reconstructed block 215.

In an embodiment, the mode selection unit 262 may be configured to select the prediction mode (for example, from prediction modes supported by the prediction processing unit 260). The prediction mode provides an optimal match or a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate-distortion optimization (RDO), that is, select a prediction mode that provides minimum rate-distortion optimization or select a prediction mode for which related rate distortion satisfies at least a prediction mode selection criterion.

In the following, prediction processing performed (for example, by using the prediction processing unit 260) and mode selection performed (for example, by using the mode selection unit 262) by an example of the encoder 20 are described in more detail.

As described above, the encoder 20 is configured to determine or select the optimal or optimum prediction mode from a set of (pre-determined) prediction modes. The set of prediction modes may include, for example, an intra prediction mode and/or an inter prediction mode.

A set of intra prediction modes may include 35 different intra prediction modes, for example, non-directional modes such as a DC (or mean) mode and a planar mode, or directional modes such as those defined in H.265; or may include 67 different intra prediction modes, for example, non-directional modes such as a DC (or mean) mode and a planar mode, or directional modes such as those defined in H.266 under development.

In a possible implementation, a set of inter prediction modes depends on available reference pictures (that is, for example, at least a part of decoded pictures stored in the DBP 230, as described above) and other inter prediction parameters, for example, depends on whether an entire reference picture or only a part of the reference picture, for example, a search window region around a region of the current block, is for searching for an optimal matching reference block, and/or for example, depends on whether pixel interpolation such as half-pel and/or quarter-pel interpolation is applied. The set of inter prediction modes may include, for example, an advanced motion vector prediction (AMVP) mode and a mergemode. In one implementation, the set of inter prediction modes may include an improved control point-based AMVP mode and an improved control point-based merge mode in embodiments of this application. In an example, the intra prediction unit 254 may be configured to perform any combination of inter prediction technologies described below.

In addition to the foregoing prediction modes, a skip mode and/or a direct mode may also be used in embodiments of this application.

The prediction processing unit 260 may be further configured to partition the image block 203 into smaller block partitions or sub-blocks, for example, by iteratively using quadtree (QT) partitioning, binary-tree (BT) partitioning, triple-tree (TT) partitioning, or any combination thereof, and perform, for example, prediction on each of the block partitions or sub-blocks. Mode selection includes selection of a tree structure of the partitioned image block 203 and selection of a prediction mode applied to each of the block partitions or sub-blocks.

The inter prediction unit 244 may include a motion estimation (ME) unit (not shown in FIG. 3) and a motion compensation (MC) unit (not shown in FIG. 3). The motion estimation unit is configured to receive or obtain the image block 203 of the picture (the current image block 203 of the current picture 201) and a decoded picture 231, or at least one or more previously reconstructed blocks, for example, reconstructed blocks of one or more other/different previously decoded pictures 231, for motion estimation. For example, a video sequence may include the current picture and the previously decoded pictures 31, or in other words, the current picture and the previously decoded pictures 31 may be a part of or form a sequence of pictures forming a video sequence.

For example, the encoder 20 may be configured to: select a reference block from a plurality of reference blocks of a same picture or different pictures in a plurality of other pictures and provide, to the motion estimation unit (not shown in FIG. 3), a reference picture and/or an offset (a spatial offset) between a location (coordinates X and Y) of the reference block and a location of the current block as an inter prediction parameter. This offset is also referred to as a motion vector (MV).

The motion compensation unit is configured to obtain the inter prediction parameter and perform inter prediction based on or by using the inter prediction parameter, to obtain the inter prediction block 245. The motion compensation performed by the motion compensation unit (not shown in FIG. 3) may include fetching or generating the prediction block based on a motion/block vector determined through motion estimation (possibly performing interpolation on sub-sample precision). Through interpolation filtering, additional pixel samples may be generated from known pixel samples, thereby potentially increasing a quantity of candidate prediction blocks that may be used for coding a picture block. Upon receiving a motion vector for a PU of the current picture block, the motion compensation unit 246 may locate a prediction block to which the motion vector points in one reference picture list. The motion compensation unit 246 may further generate syntax elements associated with blocks and video slices, for use by the decoder 30 in decoding picture blocks of the video slice.

Specifically, the inter prediction unit 244 may transmit the syntax elements to the entropy encoding unit 270. The syntax elements include the inter prediction parameter (such as indication information of selection of an inter prediction mode used for prediction of the current block after traversal of a plurality of inter prediction modes). In a possible application scenario, if there is only one inter prediction mode, the inter prediction parameter may be alternatively not carried in the syntax elements. In this case, the decoder side 30 may perform decoding directly in a default prediction mode. It can be understood that the inter prediction unit 244 may be configured to perform any combination of inter prediction technologies.

The intra prediction unit 254 is configured to obtain, for example, receive, the picture block 203 (the current picture block) and one or more previously reconstructed blocks, for example, reconstructed neighboring blocks, of the same picture for intra estimation. The encoder 20 may be, for example, configured to select an intra prediction mode from a plurality of (predetermined) intra prediction modes.

In an embodiment, the encoder 20 may be configured to select the intra prediction mode based on an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter of the selected intra prediction mode. In any case, after selecting an intra prediction mode for a block, the intra prediction unit 254 is further configured to provide the intra prediction parameter, that is, information indicating the selected intra prediction mode for the block, to the entropy encoding unit 270. In an example, the intra prediction unit 254 may be configured to perform any combination of intra prediction technologies.

Specifically, the intra prediction unit 254 may transmit the syntax elements to the entropy encoding unit 270. The syntax elements include the intra prediction parameter (such as indication information of selection of an intra prediction mode used for prediction of the current block after traversal of a plurality of intra prediction modes). In a possible application scenario, if there is only one intra prediction mode, the intra prediction parameter may alternatively not be carried in the syntax elements. In this case, the decoder side 30 may perform decoding directly in a default prediction mode.

The entropy encoding unit 270 is configured to apply an entropy encoding algorithm or scheme (for example, a variable length coding (VLC) scheme, a context adaptive VLC (CAVLC) scheme, an arithmetic coding scheme, context adaptive binary arithmetic coding (CABAC), syntax-based context-adaptive binary arithmetic coding (SBAC), probability interval partitioning entropy (probability interval partitioning entropy, PIPE) coding, or another entropy encoding method or technology) to the quantized residual coefficients 209, the inter prediction parameter, the intra prediction parameter, and/or the loop filter parameter individually or jointly (or not at all) to obtain encoded picture data 21 that can be output by an output 272, for example, in a form of an encoded bitstream 21. The encoded bitstream may be transmitted to the video decoder 30 or archived for later transmission or retrieval by the video decoder 30. The entropy encoding unit 270 may be further configured to entropy encode other syntax elements for a current video slice being encoded.

Other structural variations of the video encoder 20 can be used for encoding a video stream. For example, a non-transform based encoder 20 may quantize a residual signal directly without the transform processing unit 206 for some blocks or frames. In another implementation, the encoder 20 may have the quantization unit 208 and the inverse quantization unit 210 combined into a single unit.

Specifically, in one embodiment of this application, the encoder 20 may be configured to implement a video encoding method described in the following embodiments.

It should be understood that other structural variations of the video encoder 20 can be used for encoding a video stream. For example, for some image blocks or image frames, the video encoder 20 may quantize the residual signal directly without processing by the transform processing unit 206, and correspondingly, without processing by the inverse transform processing unit 212. Alternatively, for some image blocks or image frames, the video encoder 20 does not generate residual data, and correspondingly, there is no need for the transform processing unit 206, the quantization unit 208, the inverse quantization unit 210, and the inverse transform processing unit 212 to perform processing. Alternatively, the video encoder 20 may directly store a reconstructed image block as a reference block, without processing by the filter 220. Alternatively, the quantization unit 208 and the inverse quantization unit 210 in the video encoder 20 may be combined together. The loop filter 220 is optional, and in a case of lossless compression encoding, the transform processing unit 206, the quantization unit 208, the inverse quantization unit 210, and the inverse transform processing unit 212 are optional. It should be understood that in different application scenarios, the inter prediction unit 244 and the intra prediction unit 254 may be used selectively.

FIG. 4 is a schematic/conceptual block diagram of an example of a decoder 30 according to an embodiment of this application. The video decoder 30 is configured to receive encoded picture data (for example, an encoded bitstream) 21 encoded by, for example, the encoder 20, to obtain a decoded picture 231. In a decoding process, the video decoder 30 receives video data from the video encoder 20, for example, an encoded video bitstream that represents a picture block of an encoded video slice, and an associated syntax element.

In the example of FIG. 4, the decoder 30 includes an entropy decoding unit 304, an inverse quantization unit 310, an inverse transform processing unit 312, a reconstruction unit 314 (for example, a summer 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform decoding traversal generally reciprocal to the encoding traversal described with reference to the video encoder 20 in FIG. 3.

The entropy decoding unit 304 is configured to perform entropy decoding on the encoded picture data 21, to obtain a quantized coefficient 309, a decoded encoding parameter (not shown in FIG. 4), and/or the like, for example, any one or all of an inter prediction parameter, an intra prediction parameter, a loop filter parameter, and/or another syntax element (decoded). The entropy decoding unit 304 is further configured to forward the inter prediction parameter, the intra prediction parameter, and/or the other syntax element to the prediction processing unit 360. The video decoder 30 may receive syntax elements at a video slice level and/or a video block level.

The inverse quantization unit 310 may have a same function as the inverse quantization unit 110, the inverse transform processing unit 312 may have a same function as the inverse transform processing unit 212, the reconstruction unit 314 may have a same function as the reconstruction unit 214, the buffer 316 may have a same function as the buffer 216, the loop filter 320 may have a same function as the loop filter 220, and the decoded picture buffer 330 may have a same function as the decoded picture buffer 230.

The prediction processing unit 360 may include an inter prediction unit 344 and an intra prediction unit 354. The inter prediction unit 344 may resemble the inter prediction unit 244 in function, and the intra prediction unit 354 may resemble the intra prediction unit 254 in function. The prediction processing unit 360 is usually configured to perform block prediction and/or obtain a prediction block 365 from the encoded data 21, and (explicitly or implicitly) receive or obtain a prediction-related parameter and/or information about a selected prediction mode, for example, from the entropy decoding unit 304.

When the video slice is encoded into an intra encoded (I) slice, the intra prediction unit 354 of the prediction processing unit 360 is configured to generate the prediction block 365 for a picture block of a current video slice based on a signaled intra prediction mode and data that is from a previously decoded block of a current frame or picture. When the video frame is encoded into an inter encoded (that is, B or P) slice, the inter prediction unit 344 (for example, a motion compensation unit) of the prediction processing unit 360 is configured to generate the prediction block 365 for a video block of a current video slice based on a motion vector and another syntax element that is received from the entropy decoding unit 304. For inter prediction, the prediction block may be generated from one of the reference pictures in a reference picture list. The video decoder 30 may construct reference frame lists, a list 0 and a list 1, by using a default construction technology based on reference pictures stored in the DPB 330.

The prediction processing unit 360 is configured to determine prediction information for a video block of the current video slice by parsing the motion vector and the other syntax element, and use the prediction information to generate the prediction block for the current video block being decoded. In an example of this application, the prediction processing unit 360 determines, by using some received syntax elements, a prediction mode (for example, intra or inter prediction) for encoding the video block of the video slice, an inter prediction slice type (for example, a B slice, a P slice, or a GPB slice), construction information of one or more of the reference picture lists for the slice, a motion vector for each inter encoded video block of the slice, an inter prediction status of each inter encoded video block of the slice, and other information, to decode the video block of the current video slice. In another example of this disclosure, syntax elements received by the video decoder 30 from a bitstream include a syntax element in one or more of a received adaptive parameter set (APS), sequence parameter set (SPS), picture parameter set (PPS), or slice header.

The inverse quantization unit 310 may be configured to inversely quantize (that is, dequantize) quantized transform coefficients provided in the bitstream and decoded by the entropy decoding unit 304. An inverse quantization process may include: using a quantization parameter calculated by the video encoder 20 for each video block in the video slice, to determine a quantization degree that should be applied and, likewise, an inverse quantization degree that should be applied.

The inverse transform processing unit 312 is configured to apply an inverse transform (for example, an inverse DCT, an inverse integer transform, or a conceptually similar inverse transform process) to transform coefficients to generate residual blocks in a pixel domain.

The reconstruction unit 314 (for example, the summer 314) is configured to add an inverse transform block 313 (that is, a reconstructed residual block 313) to the prediction block 365 to obtain a reconstructed block 315 in a sample domain, for example, by adding sample values of the reconstructed residual block 313 and sample values of the prediction block 365.

The loop filter unit 320 (in a coding loop or after the coding loop) is configured to filter the reconstructed block 315 to obtain a filtered block 321, to smooth pixel transitions or improve video quality. In an example, the loop filter unit 320 may be configured to perform any combination of filtering technologies described below. The loop filter unit 320 is intended to represent one or more loop filters including a de-blocking filter, a sample-adaptive offset (SAO) filter, and another filter, for example, a bilateral filter, an adaptive loop filter (ALF), a sharpening or smoothing filter, or a collaborative filter. Although the loop filter unit 320 is shown in FIG. 3 as an in-loop filter, the loop filter unit 320 may be implemented as a post-loop filter in other configurations.

The decoded video blocks 321 in a given frame or picture are then stored in the decoded picture buffer 330 that stores reference pictures used for subsequent motion compensation.

The decoder 30 is configured to, for example, output the decoded picture 31 by using an output 332, for presentation to a user or viewing by a user.

Other variations of the video decoder 30 may be configured to decode a compressed bitstream. For example, the decoder 30 may generate an output video stream without the loop filter unit 320. For example, a non-transform based decoder 30 may inversely quantize a residual signal directly without the inverse transform processing unit 312 for some blocks or frames. In another implementation, the video decoder 30 may have the inverse quantization unit 310 and the inverse transform processing unit 312 combined into a single unit.

Specifically, the decoder 30 may be configured to implement a video decoding method described in the following embodiments.

It should be understood that other structural variations of the video decoder 30 can be used for decoding an encoded video bitstream. For example, the video decoder 30 may generate an output video stream without processing by the filter 320. Alternatively, for some image blocks or image frames, the entropy decoding unit 304 of the video decoder 30 does not obtain quantized coefficients through decoding, and correspondingly, there is no need for the inverse quantization unit 310 and the inverse transform processing unit 312 to perform processing. The loop filter 320 is optional, and in a case of lossless compression, the inverse quantization unit 310 and the inverse transform processing unit 312 are optional. It should be understood that in different application scenarios, the inter prediction unit and the intra prediction unit may be used selectively.

It should be understood that on the encoder 20 and the decoder 30 in this application, a processing result from a procedure may be output to a next procedure after being further processed. For example, after a procedure such as interpolation filtering, motion vector derivation, or loop filtering, an operation such as clip or shift is further performed on a processing result of a corresponding procedure.

For example, a motion vector that is of control points of the current image block and that is derived based on a motion vector of a neighboring affine code block, or a motion vector that is of a sub-block of the current image block and that is derived based on the motion vector of the neighboring affine code block may be further processed. This is not limited in this application. For example, a value range of the motion vector is restricted to be within a specific bit depth. If an allowed bit depth of the motion vector is bitDepth, a range of the motion vector is from $-2\wedge(\text{bitDepth}-1)$ to $2\wedge(\text{bitDepth}-1)-1$, where the symbol "$\wedge$" represents a power. If bitDepth is 16, a value range is from $-32768$ to $32767$. If bitDepth is 18, the value range is from $-131072$ to $131071$.

For another example, the value of the motion vector (for example, motion vectors MVs of four 4×4 sub-blocks in one 8×8 image block) may further be constrained, so that a maximum difference between integer parts of the MVs of the four 4×4 sub-blocks does not exceed N (for example, N may be set to 1) pixels.

The motion vector may be constrained in the following two manners, so that the motion vector is within a specific bit width:

Manner 1: Remove an overflow most significant bit from a motion vector:

$$ux = (vx + 2^{bitDepth})\%2^{bitDepth}$$

$$vx = (ux \geq 2^{bitDepth-1})?(ux - 2^{bitDepth}):ux$$

$$uy = (vy + 2^{bitDepth})\%2^{bitDepth}$$

$$vy = (uy \geq 2^{bitDepth-1})?(uy - 2^{bitDepth}):uy$$

where vx is a horizontal component of the motion vector of the image block or the sub-block of the image block, vy is a vertical component of the motion vector of the image block or the sub-block of the image block, ux and uy are intermediate values, and bitDepth represents a bit depth.

For example, if a value of vx is $-32769$, 32767 is obtained according to the foregoing formulas. In computer system, decimal numbers are stored in a computer as a two's complement. The two's complement of $-32769$ is 1,0111,1111,1111,1111 (17 bits), and then the overflow most significant bit is discarded by the computer. In this case, a value of vx is 0111,1111,1111,1111, with the decimal number of 32767, which is same as the output by applying formulas.

Manner 2: Clip the motion vector, as shown in the following formulas:

$$vx = \text{Clip3}(-2^{bitDepth-1}, 2^{bitDepth-1}-1, vx)$$

$$vy = \text{Clip3}(-2^{bitDepth-1}, 2^{bitDepth-1}-1, vy)$$

where vx represents a horizontal component of the motion vector of the image block or the sub-block of the image block, and vy represents a vertical component of the motion vector of the image block or the sub-block of the image block, where x, y, and z respectively correspond to three input values of an MV clipping process Clip3, and Clip3 is defined to indicate clipping a value of z into a range [x, y].

$$Clip3(x, y, z) = \begin{cases} x, & z < x \\ y, & z > y \\ z, & \text{otherwise} \end{cases}$$

Figure 5:
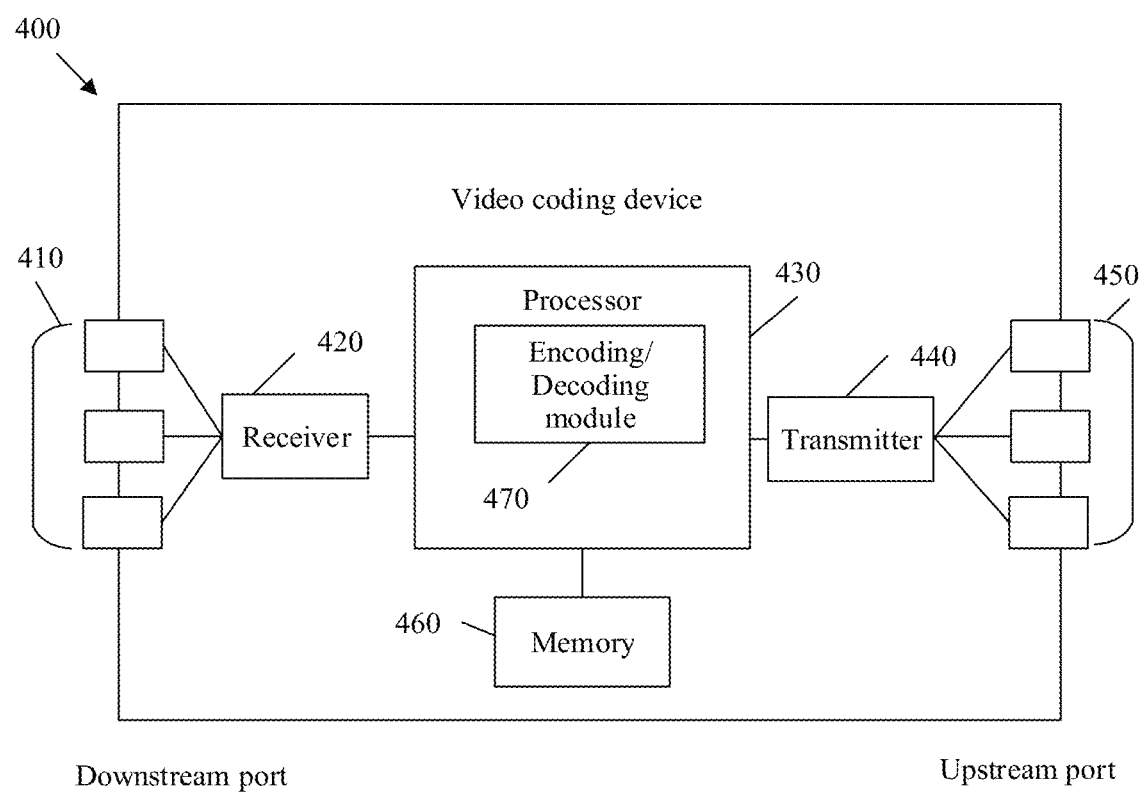
FIG. 5 is a schematic diagram of a structure of a video coding device according to an embodiment of this application.

FIG. 5 is a schematic diagram of a structure of a video coding device 400 (for example, a video encoding device 400 or a video decoding device 400) according to an embodiment of this application. The video coding device 400 is suitable for implementing an embodiment described in this specification. In an embodiment, the video coding device 400 may be a video decoder (for example, the decoder 30 in FIG. 1) or a video encoder (for example, the encoder 20 in FIG. 1). In another embodiment, the video coding device 400 may be one or more components of the decoder 30 in FIG. 1 or of the encoder 20 in FIG. 1.

The video coding device 400 includes: ingress ports 410 and receiver units (Rx) 420 for receiving data; a processor, a logic unit, or a central processing unit (CPU) 430 that are for processing the data; transmitter units (Tx) 440 and egress ports 450 that are for transmitting the data; and a memory 460 for storing the data. The video coding device 400 may also include optical-to-electrical components and electrical-to-optical (EO) components coupled to the ingress ports 410, the receiver units 420, the transmitter units 440, and the egress ports 450, for egress or ingress of optical or electrical signals.

The processor 430 is implemented by hardware and software. The processor 430 may be implemented as one or more CPU chips, cores (for example, a multi-core processor), FPGAs, ASICs, and DSPs. The processor 430 communicates with the ingress ports 410, the receiver units 420, the transmitter units 440, the egress ports 450, and the memory 460. The processor 430 includes a coding module 470 (for example, an encoding module 470 or a decoding module 470). The encoding/decoding module 470 implements embodiments disclosed in this specification, to implement the chrominance block prediction method provided in embodiments of this application. For example, the encoding/decoding module 470 implements, processes, or provides various coding operations. Therefore, inclusion of the encoding/decoding module 470 provides a substantial improvement to functions of the video coding device 400 and affects a transformation of the video coding device 400 to a different state. Alternatively, the encoding/decoding module 470 is implemented as instructions stored in the memory 460 and executed by the processor 430.

The memory 460 includes one or more disks, tape drives, and solid state drives and may be used as an overflow data storage device, to store programs when such programs are selected for execution, and to store instructions and data that are read during program execution. The memory 460 may be volatile and/or non-volatile, and may be a read-only memory (ROM), a random access memory (RAM), a ternary content-addressable memory (ternary content-addressable memory, TCAM), and/or a static random access memory (SRAM).

Figure 6:
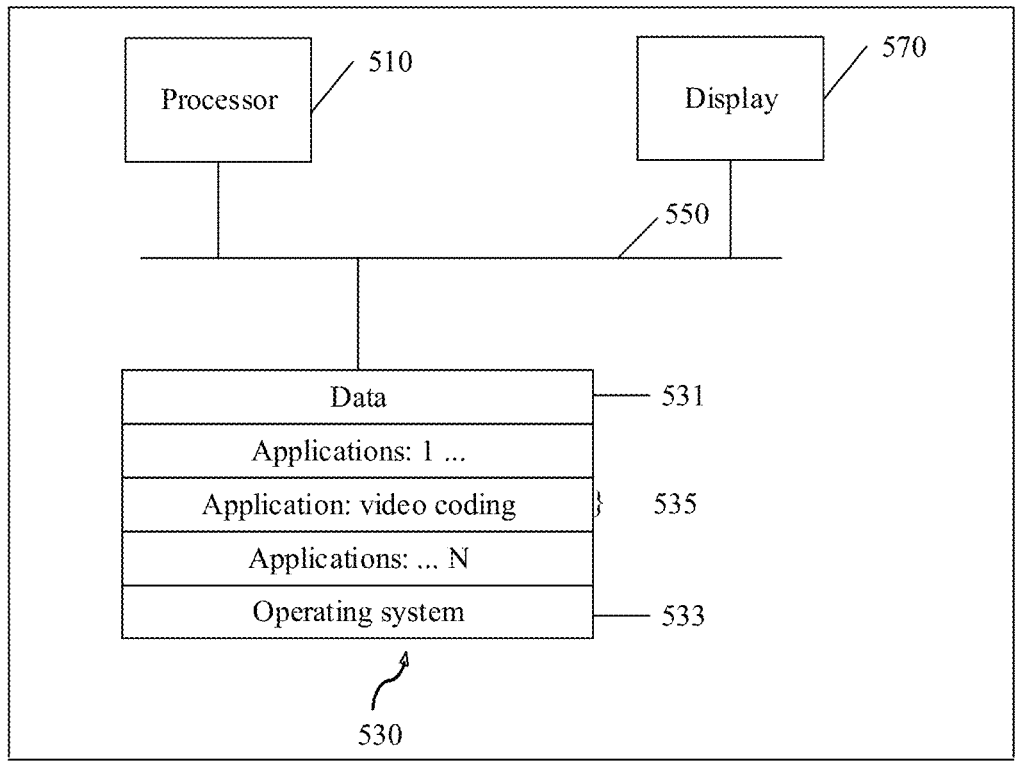
FIG. 6 is a schematic diagram of a structure of an encoding apparatus or a decoding apparatus according to an embodiment of this application.

FIG. 6 is a simplified block diagram of an apparatus 500 that may be used as either one or both of the source device 12 and the destination device 14 in FIG. 1 according to an example embodiment. The apparatus 500 can implement the technologies of this application. In other words, FIG. 6 is a schematic block diagram of an implementation of an encoding device or a decoding device (briefly referred to as a coding device 500) according to an embodiment of this application. The coding device 500 may include a processor 510, a memory 530, and a bus system 550. The processor and the memory are connected through the bus system. The memory is configured to store instructions. The processor is configured to execute the instructions stored in the memory. The memory of the decoding device stores program code. The processor may invoke the program code stored in the memory, to perform various video encoding or decoding methods described in this application, and in particular, various new video encoding methods or video decoding methods. To avoid repetition, details are not described herein again.

In embodiments of this application, the processor 510 may be a central processing unit ("CPU" for short), or the processor 510 may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The memory 530 may include a read-only memory (ROM) device or a random access memory (RAM) device. Any other proper type of storage device may be alternatively used as the memory 530. The memory 530 may include code and data 531 accessed by the processor 510 by using the bus 550. The memory 530 may further include an operating system 533 and an application program 535. The application program 535 includes at least one program that allows the processor 510 to perform the video encoding or decoding method described in this application. For example, the application program 535 may include applications 1 to N, and further include a video encoding or decoding application (video coding application for short) that performs the video encoding method or the video decoding method described in this application.

The bus system 550 may further include a power bus, a control bus, a status signal bus, or the like, in addition to a data bus. However, for clear description, various types of buses in the figure are marked as the bus system 550.

Optionally, the coding device 500 may further include one or more output devices, for example, a display 570. In an example, the display 570 may be a touch display that combines a display and a touch unit that operably detects touch input. The display 570 may be connected to the processor 510 by using the bus 550.

The following describes technical solutions in embodiments of this application.

The technical solutions in embodiments of this application may be applied to a bandwidth-sensitive network streaming media application scenario such as video communication, video on demand, or video livestreaming.

Figure 7:
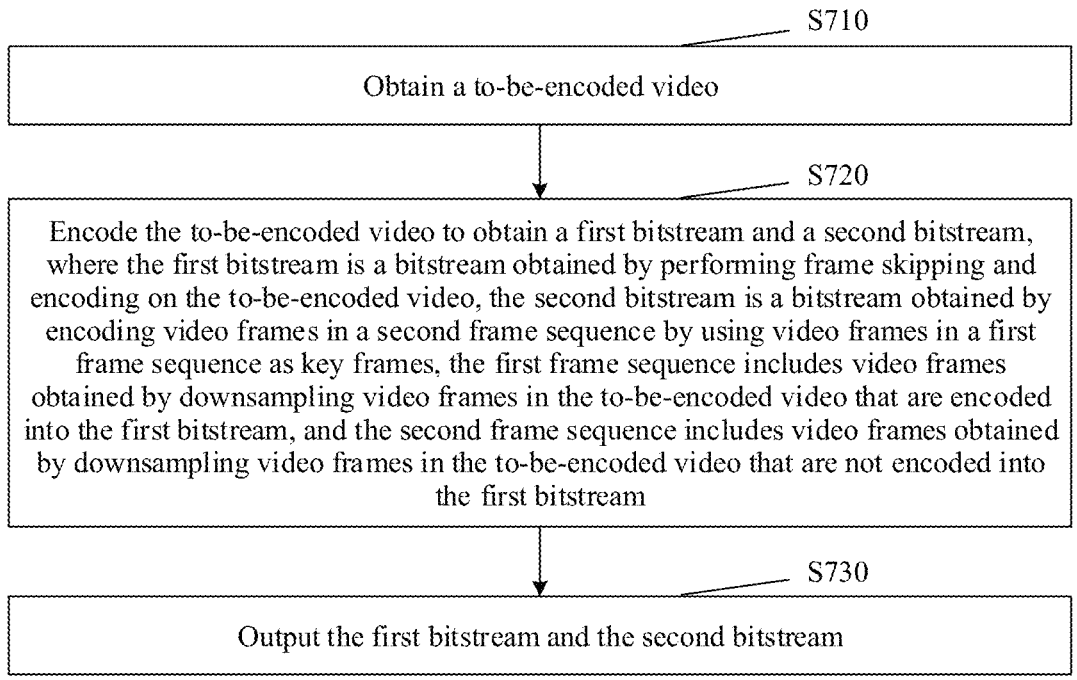
FIG. 7 is a schematic flowchart of a video encoding method according to an embodiment of this application.

FIG. 7 is a schematic flowchart of a video encoding method according to this application. The method includes S710, S720, and S730. In some examples, the video encoding method may be performed by the source device 12 in FIG. 1, may be performed by the video coding system shown in FIG. 2, or may be performed by the video coding device 400 shown in FIG. 5.

S710: Obtain a to-be-encoded video. The to-be-encoded video may include one or more video frames.

For example, when the method in some embodiments is performed by the source device 12 in FIG. 1, the to-be-encoded video may be obtained from the picture preprocessor 18 or the picture source 16.

For another example, when the method in some embodiments is performed by the video coding system shown in FIG. 2, the to-be-encoded video may be obtained from the imaging device 41, the to-be-encoded video may be read from the memory 44, or the to-be-encoded video may be received from another device through the antenna 42.

For another example, when the method in some embodiments is performed by the video coding device 400 in FIG. 5, the to-be-encoded video may be read from the memory 460, or the to-be-encoded video may be received from another device by using the receiver 420.

S720: Encode the to-be-encoded video to obtain a first bitstream and a second bitstream, where the first bitstream is a bitstream obtained by performing frame skipping and encoding on the to-be-encoded video, the second bitstream is a bitstream obtained by encoding video frames in a second frame sequence by using video frames in a first frame sequence as key frames, the first frame sequence includes video frames obtained by downsampling video frames in the to-be-encoded video that are encoded into the first bitstream, and the second frame sequence includes video frames obtained by downsampling video frames in the to-be-encoded video that are not encoded into the first bitstream.

When the method in some embodiments is performed by the source device 12 in FIG. 1, this step may be performed by the encoder 20 in the source device 12. When the method in some embodiments is performed by the video coding system in FIG. 2, this step may be performed by the encoder 20 in the video coding system. When the method in some embodiments is performed by the video coding device in FIG. 5, this step may be performed by the encoding module 470 in the video coding device.

S730: Output the first bitstream and the second bitstream.

When the method in some embodiments is performed by the source device 12 in FIG. 1, this step may be performed by the communication interface 22 in the source device 12. When the method in some embodiments is performed by the video coding system in FIG. 2, this step may be performed by an output interface of the encoder 20. When the method in some embodiments is performed by the video coding device in FIG. 5, this step may be performed by an output interface of the encoding module 470.

Figure 8:
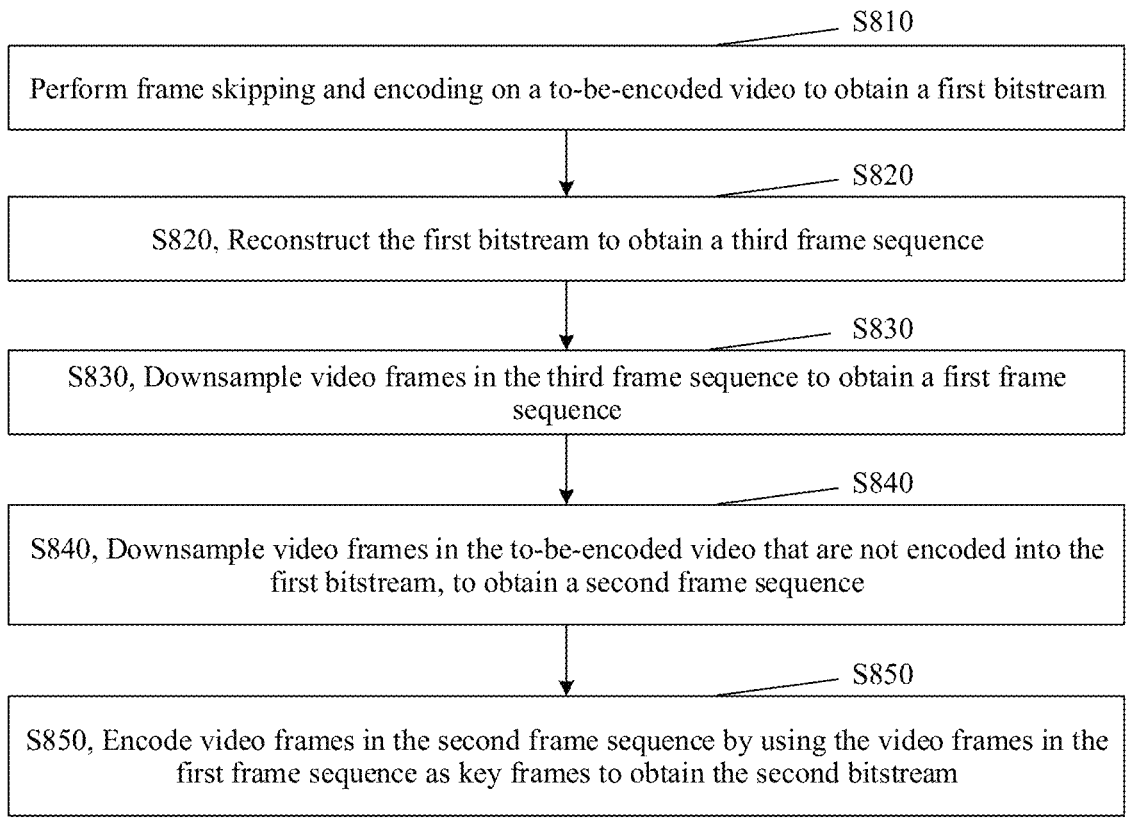
FIG. 8 is a schematic flowchart of a video encoding method according to another embodiment of this application.

With reference to FIG. 8, the following describes a schematic flowchart of an implementation method for encoding a to-be-encoded video to obtain a first bitstream and a second bitstream according to this application. The method includes S810 to S850.

S810: Perform frame skipping and encoding on the to-be-encoded video to obtain the first bitstream.

Frame skipping and encoding means skipping or discarding some video frames in the to-be-encoded video, and encoding only the other video frames. For ease of subsequent description, in this application, during frame skipping and encoding, a video frame that is in the to-be-encoded video and that is encoded into the first bitstream is referred to as a frequency skipping frame.

For this step, refer to an implementation of frame skipping and encoding in a conventional technology. Details are not described herein.

S820: Reconstruct the first bitstream to obtain a third frame sequence.

In other words, frequency skipping frames are reconstructed based on the first bitstream, and a sequence including the reconstructed video frames is referred to as a third frame sequence. For this step, refer to a reconstruction method in the conventional technology. Details are not described herein.

S830: Downsample video frames in the third frame sequence to obtain a first frame sequence.

That is, the resolution of the video frames in the third frame sequence is reduced to obtain low-resolution video frames, and a sequence including these low-resolution video frames is referred to as the first frame sequence. For an implementation of this step, refer to an implementation of downsampling video frames in the conventional technology. Details are not described herein.

S840: Downsample video frames in the to-be-encoded video that are not encoded into the first bitstream, to obtain a second frame sequence.

That is, video frames other than the frequency skipping frames in the to-be-encoded video are downsampled, to reduce resolution of the video frames other than the frequency skipping frames in the to-be-encoded video. For ease of subsequent description, in this application, a non frequency skipping frame in the to-be-encoded video is referred to as an intermediate frame. A sequence including video frames obtained by downsampling intermediate frames in the to-be-encoded video is referred to as the second frame sequence.

It may be understood that all of the intermediate frames in the to-be-encoded video may be downsampled to obtain the second frame sequence, or a part of the intermediate frames in the to-be-encoded video are sampled to obtain the second frame sequence.

A downsampling frequency of an intermediate frame in the to-be-encoded video is usually the same as a downsampling frequency of a video frame in the third frame sequence. In other words, the resolution of a video frame in the second frame sequence is the same as the resolution of a video frame in the third frame sequence.

S850: Encode video frames in the second frame sequence by using the video frames in the first frame sequence as key frames, to obtain the second bitstream.

For example, for each video frame in the first frame sequence, a frame that is in the second frame sequence and that is between the video frame and a video frame after the video frame in time sequence is encoded by using the video frame as a key frame. In this case, a bitstream obtained through encoding is the second bitstream. For a method for encoding the corresponding video frame in the second frame sequence by using the video frame in the first frame sequence as the key frame, refer to an encoding scheme in the conventional technology. Details are not described herein.

Compared with the second bitstream, the first bitstream may be referred to as a high-resolution bitstream. Correspondingly, the second bitstream may be referred to as a low-resolution bitstream.

An entity for performing the video encoding method in one embodiment may be referred to as an encoder side. In some examples, the encoder side may use a coding architecture combining two layers: a high-resolution (high resolution) layer and a low-resolution (low resolution) layer. Certainly, the encoder side may alternatively use a plurality of layers. This is not limited in this application.

At the high-resolution (high resolution) layer, a standard encoder may perform frame skipping and encoding on the to-be-encoded video, to obtain the first bitstream. After the first frame sequence is obtained by downsampling the third frame sequence obtained by reconstructing the first bitstream at the high-resolution layer, and the second frame sequence is obtained by downsampling the intermediate frames at the high-resolution layer, the standard encoder may encode the video frames in the second frame sequence at the low-resolution layer by using the video frames in the first frame sequence as the key frames, to obtain the second bitstream.

Figure 9:
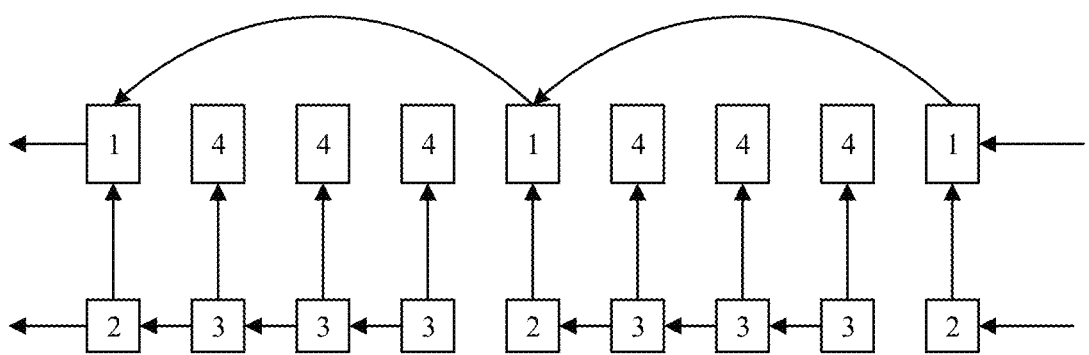
FIG. 9 is a schematic diagram of a reference relationship between video frames on which video encoding is performed according to an embodiment of this application.

With reference to FIG. 9, the following describes an example of encoding a to-be-processed video to obtain a first bitstream and a second bitstream. The to-be-processed video includes video frames numbered 1 and 4. A standard encoder encodes video frames numbered 1, to obtain the first bitstream. A video frame sequence obtained by decoding the first bitstream is referred to as a reconstructed-frame sequence. Video frames in the reconstructed-frame sequence one-to-one correspond to the video frames numbered 1. The video frames in the reconstructed-frame sequence are downsampled to obtain low-resolution video frames numbered 2, and all of the low-resolution video frames numbered 2 constitute a first frame sequence. Video frames numbered 4 are downsampled to obtain low-resolution video frames numbered 3, and these low-resolution video frames constitute a second frame sequence. The video frames numbered 3 are encoded by using the video frames numbered 2 as key frames, to obtain the second bitstream.

It may be understood that an arrow in FIG. 9 represents a reference relationship corresponding to related processing. An arrow between a video frame numbered 1 and a video frame numbered 2 indicates that the video frame numbered 2 is obtained by downsampling a reconstructed frame corresponding to the video frame numbered 1. An arrow between a video frame numbered 3 and a video frame numbered 4 indicates that the video frame numbered 3 is obtained by downsampling the video frame numbered 4. An arrow between video frames numbered 1 indicates that a video frame at the end point of the arrow is encoded with reference to a video frame at the start point of the arrow. An arrow between video frames numbered 3 and an arrow between a video frame numbered 3 and a video frame numbered 2 each indicate that a video frame at the end point of the arrow is encoded with reference to a video frame at the start point of the arrow.

In the example shown in FIG. 9, every two frequency skipping frames are separated by three intermediate frames, that is, the frame rate of the first bitstream obtained through frequency skipping and encoding is one third of the frame rate of a to-be-encoded video frame.

In embodiments of this application, after the first bitstream and the second bitstream are obtained through encoding, the first bitstream and the second bitstream may be output. For example, when the method in one embodiment is performed by the source device 12 in FIG. 1, the first bitstream and the second bitstream may be output through the communication interface 22. For another example, when the method in one embodiment is performed by the video coding system in FIG. 2, the first bitstream and the second bitstream may be stored in the memory 44, or the first bitstream and the second bitstream may be sent through the antenna 42. For another example, when the method in one embodiment is performed by the video coding device in FIG. 5, the first bitstream and the second bitstream may be stored in the memory 460, or the first bitstream and the second bitstream may be sent by using the transmitter 440.

According to the video encoding method in some embodiments, when an encoded bitstream of skipping frames is obtained, low-resolution bitstream information corresponding to skipped video frames is further obtained, so that a decoder side can predict a video frame between skipping frames more accurately based on the low-resolution bitstream information, and a bit rate can be further reduced. For example, when a downsampling rate is ⅑ and a frame skipping rate is ¼, the bit rate may be reduced by 50.

For example, during video communication, there are a plurality of asymmetric terminal devices such as 4G wireless, Wi-Fi wireless, broadband, or narrowband devices, and an end-to-end latency requirement is high (for example, a latency is required to be less than 300 milliseconds). In a scenario in which a network bandwidth requirement is very high, transmission bandwidth can be effectively reduced by using the technical solutions in embodiments of this application.

For another example, in a scenario in which most costs of a video website are traffic fees, using the video encoding method in some embodiments disclosed in this application can effectively improve video encoding efficiency, and reduce bandwidth, thereby effectively reducing operation costs of a video network.

For the foregoing video encoding method provided in this application, this application further provides a video decoding method. FIG. 10 is an example flowchart of a video decoding method according to this application. The method includes at least S1010 and S1020.

The video decoding method may be performed by the destination device 14 in FIG. 1, may be performed by the video coding system 40 in FIG. 2, or may be performed by the video coding device 400 in FIG. 5.

S1010: Obtain a first bitstream and a second bitstream, where the first bitstream is a bitstream obtained by performing frame skipping and encoding on a source video, the second bitstream is a bitstream obtained by encoding video frames in a second frame sequence by using video frames in a first frame sequence as key frames, the first frame sequence includes video frames obtained by downsampling video frames in the source video that are encoded into the first bitstream, and the second frame sequence includes video frames obtained by downsampling video frames in the source video that are not encoded into the first bitstream.

For example, when the method in one embodiment is performed by the destination device 14 in FIG. 1, a to-be-decoded bitstream may be obtained through the communication interface 28. For another example, when the method in one embodiment is performed by the video coding system 40 in FIG. 2, the to-be-decoded bitstream may be read from the memory 44, or the to-be-decoded stream may be received through the antenna 42. For another example, when the method in one embodiment is performed by the video coding device 400 in FIG. 5, the to-be-decoded bitstream may be received by using the receiver 420, or the to-be-decoded bitstream may be read from the memory 462.

S1020: Determine a target video based on the first bitstream and the second bitstream, where the target video includes content expressed in the source video.

When the method in one embodiment is performed by the destination device 14 in FIG. 1, S1020 may be performed by the decoder 30. When the method in one embodiment is performed by the video coding system 40 in FIG. 2, S1020 may be performed by the decoder 30. When the method in one embodiment is performed by the video coding device 400 in FIG. 5, S1020 may be performed by the decoding module 470.

The target video may include all or a part of content of the source video. For example, the target video may include all or a part of video frames in the source video, and each video frame in the target video frames may include all or a part of content of a corresponding video frame in the source video, provided that the target video can express visual information that can be understood by human eyes and that is carried in the source video.

It may be understood that, in S1020, it is expected that content in the target video obtained based on the first bitstream and the second bitstream is completely the same as the content expressed in the source video. Specifically, for example, it is expected that the target video includes all video frames in the source video, and it is expected that each video frame in the target video is the same as a corresponding video frame in the source video. However, generally, even if the target video includes all the video frames in the source video, a video frame in the target video may be different from a corresponding video frame in the source video to some extent, for example, in definition, light intensity, or pixel information. Details are not described herein.

In some possible implementations, the determining a target video based on the first bitstream and the second bitstream includes: determining the third frame sequence and the second frame sequence based on the first bitstream and the second bitstream; and determining the target video based on the second frame sequence and the third frame sequence.

The following describes an example implementation of determining a third frame sequence and a second frame sequence based on the first bitstream and the second bitstream.

In an example implementation, the determining a third frame sequence and the second frame sequence based on the first bitstream and the second bitstream may include the following steps: decoding the first bitstream to obtain the third frame sequence, and downsampling video frames in the third frame sequence to obtain the first frame sequence; and decoding the second bitstream by using the video frames in the first frame sequence as the key frames to obtain the second frame sequence.

For an implementation of decoding the first bitstream to obtain the third frame sequence, refer to a decoding scheme in the conventional technology. For an implementation of downsampling video frames in the third frame sequence to obtain the first frame sequence, refer to a downsampling method in the conventional technology. For an implementation of decoding the second bitstream by using the video frames in the first frame sequence as the key frames, refer to a decoding scheme in the conventional technology. Details are not described herein.

It may be understood that resolution of a video frame in the first frame sequence is lower than resolution of a video frame in the third frame sequence, and video frames in the first frame sequence one-to-one correspond to video frames in the third frame sequence. Specifically, each video frame in the first frame sequence is obtained by downsampling a corresponding video frame in the third frame sequence.

It may be understood that resolution of a video frame in the second frame sequence is usually the same as resolution of a video frame in the first frame sequence.

In the method in some embodiments, the determining the target video based on the second frame sequence and the third frame sequence may be implemented in a plurality of different manners. For ease of description, in the following content, a video frame in the second frame sequence is referred to as a to-be-processed frame, a video frame in the first frame sequence is referred to as a low-resolution reference frame, and a video frame in the third frame sequence is referred to as a reference frame.

In a first example implementation of determining the target video based on the second frame sequence and the third frame sequence, a motion vector field of each to-be-processed frame in the second frame sequence relative to a corresponding key frame in the first frame sequence may be determined, where the motion vector field is referred to as an initial motion vector field; then, the initial motion vector field of each to-be-processed frame is upsampled to obtain a high-resolution motion vector field of the corresponding to-be-processed frame, where the high-resolution motion vector field corresponding to each to-be-processed frame may be referred to as a to-be-processed motion vector field corresponding to the to-be-processed frame; next, an intermediate frame between reference frames in the third frame sequence is determined based on the to-be-processed motion vector field of each to-be-processed frame and the reference frames in the third frame sequence; and finally, the video frames in the third frame sequence and the determined intermediate frame constitute the target video.

Compared with a method for directly interpolating a frame based on the third frame sequence to obtain the target video, this implementation helps avoid a problem that a subjective perception difference occurs in the target video. In particular, when complex motion such as fast motion, irregular motion, or fluid motion occurs between video frames in the source video corresponding to the first bitstream and the second bitstream, this implementation achieves a better effect, for example, avoiding artifacts generated in the target video. In addition, in comparison with carrying structured information such as a motion vector of a skipped frame, carrying low-resolution image information of the skipped frame in the second bitstream can make restoring the source video by the decoder side more flexible and open, and is more conducive to continuous optimization of the method for restoring the source video by the decoder side.

In this implementation, for an implementation of determining a motion vector field of each to-be-processed frame in the second frame sequence relative to a corresponding key frame in the first frame sequence, refer to an implementation of determining a motion vector field of a video frame relative to a key frame in the conventional technology. For example, an optical flow method may be used for determining the motion vector field of each to-be-processed frame in the second frame sequence relative to the corresponding key frame in the first frame sequence.

In this implementation, the resolution of the high-resolution motion vector field obtained by upsampling the initial motion vector field of each to-be-processed frame is usually the same as the resolution of the video frame in the third frame sequence.

In this implementation, for an implementation of determining an intermediate frame between reference frames in the third frame sequence based on the to-be-processed motion vector field of each to-be-processed frame and the reference frames in the third frame sequence, refer to an implementation of determining an intermediate frame between the skipping frames based on a motion vector field of a skipped frame and the skipping frames in the conventional technology. For example, the first video frame before the to-be-processed frame in time sequence and the first video frame after the to-be-processed frame in time sequence are found in the third frame sequence as a forward reference frame and a backward reference frame respectively, and bilinear interpolation is performed based on the to-be-processed motion vector field, to obtain an intermediate frame.

In a second example implementation of determining the target video based on the second frame sequence and the third frame sequence, a luminance histogram of a fourth frame sequence obtained by sorting video frames in the first frame sequence and the second frame sequence in time sequence may be obtained; the luminance histogram is analyzed to obtain illumination change information between video frames in the fourth frame sequence; before frame interpolation is performed based on the reference frame in the third frame sequence to obtain an intermediate frame, whether illumination between the reference frame and the to-be-obtained intermediate frame changes is determined based on the illumination change information; and if the illumination changes, the optical information of the reference frame may be processed based on the illumination change information, and frame interpolation is performed based on processed optical information to obtain the intermediate frame.

In a scenario in which an illumination change between the reference frame and the intermediate frame is large, this implementation can improve prediction accuracy of the intermediate frame. For example, in a scenario in which the light intensity of a forward reference frame and the light intensity of a backward reference frame are both low, but the light intensity of an intermediate frame in the source video is high, the light intensity of the intermediate frame predicted by using a frame interpolation method in the conventional technology is also low, but more accurate light intensity of the intermediate frame is predicted by using the encoding method and the decoding method in this application.

In this implementation, the illumination change information may include an illumination change system. The processing optical information of the reference frame based on the illumination change information may include: multiplying the optical information of the reference frame by an illumination change coefficient.

In this implementation, for a method for obtaining a luminance histogram of video frames and a method for obtaining illumination change information based on the luminance histogram, refer to related content in the conventional technology. Details are not described herein.

In a third example implementation of determining the target video based on the second frame sequence and the third frame sequence, scene similarity analysis may be performed on video frames in the first frame sequence and the second frame sequence to obtain scene switching information between a video frame in the second frame sequence and a video frame in the first frame sequence, where the scene switching information may be used as scene switching information between a reference frame in the third frame sequence and a to-be-obtained intermediate frame; whether a mode of switching between the reference frame and the to-be-obtained intermediate frame is a hard switching mode or a fade-in/fade-out mode is determined based on the scene switching information; if a mode of switching between the to-be-obtained intermediate frame and the forward reference frame is a hard switching mode, the intermediate frame is determined based on only the backward reference frame; and if a mode of switching between the to-be-obtained intermediate frame and the backward reference frame is a hard switching mode, the intermediate frame is determined based on only the forward reference frame.

When a difference between the reference frame and the intermediate frame is large, this implementation can achieve a particularly marked effect of improved accuracy of the predicted intermediate frame.

An entity for performing the video decoding method in some embodiments may be referred to as a decoder side. In some examples, the decoder side may use a decoding architecture combining two layers: a high-resolution layer and a low-resolution layer. Certainly, the decoder side may alternatively use a plurality of layers. This is not limited in this application.

A standard decoder may decode the first bitstream at the high-resolution layer to obtain the third frame sequence. After the third frame sequence is downsampled at the high-resolution layer to obtain the first frame sequence, a non-standard decoder may decode the second bitstream at the low-resolution layer by using the video frames in the first frame sequence as the key frames, to obtain the second frame sequence.

The foregoing describes the decoding method in this application. For ease of understanding, the following describes, with reference to FIG. 11, an example implementation of decoding a to-be-decoded bitstream to obtain a third frame sequence and a second frame sequence, and obtaining a target video based on the third frame sequence and the second frame sequence.

As shown in FIG. 11, a standard decoder may decode a first bitstream, to obtain a frame sequence including video frames numbered 1, where the frame sequence is a third frame sequence; each video frame numbered 1 is downsampled, to obtain a low-resolution video frame numbered 2, where all low-resolution video frames numbered 2 constitute a first frame sequence; a non-standard decoder decodes a second bitstream by using the low-resolution video frames numbered 2 as key frames, to obtain video frames numbered 3, where all video frames numbered 3 constitute a second frame sequence. According to the foregoing frame interpolation method, intermediate frames numbered 4 are determined by using the video frames numbered 1, 2, and 3, and the video frames numbered 1 and the intermediate frames numbered 4 constitute a target video.

It should be noted that an arrow in FIG. 11 represents a reference relationship between video frames that corresponds to related processing. Specifically, a video frame at the end point of the arrow is obtained through processing with reference to a video frame at the start point of the arrow.

In the foregoing embodiment of this application, the following is described: In addition to the high-resolution first bitstream, the encoder side also outputs the low-resolution second bitstream. In this way, not only a bit rate can be reduced to improve transmission efficiency or bandwidth, but also the decoder side can accurately predict the source video by analyzing information such as a motion vector field, illumination information, or scene switching information.

It may be understood that this application further provides another method that not only can reduce a bitstream to improve transmission efficiency or bandwidth, but also can improve video prediction accuracy, that is, a method for restoring, on a decoder side, a source video based on a neural network and a first bitstream, to obtain a target video.

For example, a third frame sequence and the source video that are obtained through reconstruction on an encoder side may be used as a training data pair to train the neural network. The third frame sequence is training data, and the source video may be used as ground truth data.

A trained neural network is deployed on the decoder side. In this way, during actual video encoding and decoding application, the encoder side outputs the first bitstream. After the decoder side receives the first bitstream, the decoder side may input, into the neural network, the third frame sequence obtained by decoding the first bitstream, so that the neural network can predict the target video based on the third frame sequence. For example, a target video whose frame rate and resolution are both the same as those of the source video may be predicted.

FIG. 12 is a diagram of an example structure of a video encoding apparatus according to this application. The apparatus 1200 includes an obtaining module 1210, an encoding module 1220, and an output module 1230. The apparatus 1200 may implement the method shown in FIG. 7 or FIG. 8.

For example, the obtaining module 1210 is configured to perform S710, the encoding module 1220 is configured to perform S720, and the output module 1230 is configured to perform S730.

For another example, the encoding module 1220 may be configured to perform S810 to S850.

Figure 13:
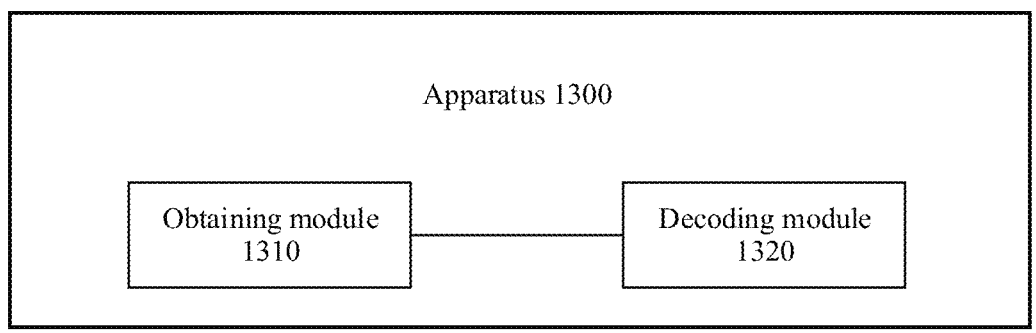
FIG. 13 is a schematic diagram of a structure of a video decoding apparatus according to an embodiment of this application.

FIG. 13 is a diagram of an example structure of a video decoding apparatus according to this application. The apparatus 1300 includes an obtaining module 1310 and a decoding module 1320. The apparatus 1300 may implement the method shown in FIG. 10.

For example, the obtaining module 1310 is configured to perform S1010, and the decoding module 1320 is configured to perform S1020.

Optionally, the apparatus 1300 may further include: a determining module, configured to perform a corresponding operation in FIG. 10, for example, configured to determine a motion vector field, illumination information, or scene switching information.

Figure 14:
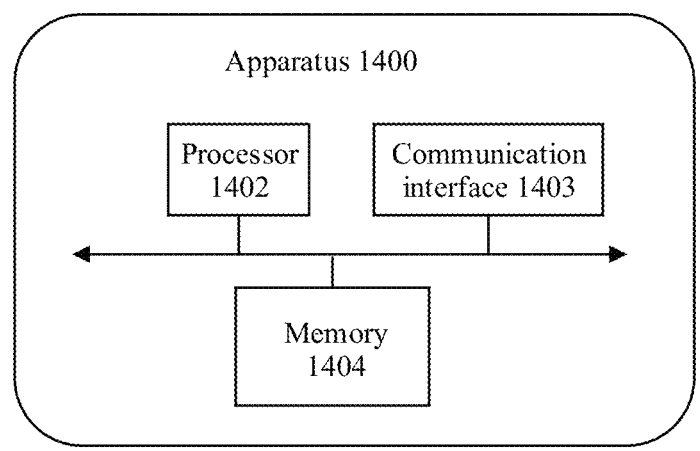
FIG. 14 is a schematic diagram of a structure of a video encoding apparatus or a video decoding apparatus according to another embodiment of this application.

This application further provides an apparatus 1400 shown in FIG. 14. The apparatus 1400 includes a processor 1402, a communication interface 1403, and a memory 1404.

The processor 1402, the memory 1404, and the communication interface 1403 may communicate with each other through a bus. The memory 1404 stores executable code. The processor 1402 reads the executable code in the memory 1404 to perform a corresponding method. The memory 1404 may further include another software module required for running a process, such as an operating system.

The processor 1402 may be a central processing unit (CPU). The memory 1404 may include a volatile memory, for example, a random access memory (RAM). The memory 1404 may further include a non-volatile memory (NVM), for example, a read-only memory (ROM), a flash memory, a hard disk drive (HDD), or a solid-state initiator (SSD).

In an example, the apparatus 1400 may be a chip configured to perform encoding, or the apparatus 1400 may be an encoding device. For example, the executable code in the memory 1404 is used for implementing the method shown in FIG. 7, and the processor 1402 reads the executable code in the memory 1404 to perform the method shown in FIG. 7.

In an example, the apparatus 1400 may be a chip configured to perform decoding, or the apparatus 1400 may be a decoding device. For example, the executable code in the memory 1404 is used for implementing the method shown in FIG. 10, and the processor 1402 reads the executable code in the memory 1404 to perform the method shown in FIG. 10.

A person skilled in the art can appreciate that functions described with reference to various illustrative logical blocks, modules, and algorithm steps disclosed and described herein may be implemented by hardware, software, firmware, or any combination thereof. If software is used for implementation, the functions described with reference to the illustrative logical blocks, modules, and steps may be stored in or transmitted over a computer-readable medium as one or more instructions or code and executed by a hardware-based processing unit. The computer-readable medium may include a computer-readable storage medium corresponding to a tangible medium, such as a data storage medium, or any communication medium that facilitates transmission of a computer program from one place to another (for example, based on a communication protocol). In this manner, the computer-readable medium may generally correspond to: (1) a non-transitory tangible computer-readable storage medium, or (2) a communication medium, for example, a signal or a carrier. The data storage medium may be any available medium that can be accessed by one or more computers or one or more processors to retrieve instructions, code, and/or data structures for implementing the technologies described in this application. A computer program product may include a computer-readable medium. By way of example and not limitation, such computer-readable storage media may include a RAM, a ROM, an EEPROM, a CD-ROM or another optical disc storage apparatus, a magnetic disk storage apparatus or another magnetic storage apparatus, a flash memory, or any other medium that can store required program code in a form of instructions or data structures and that can be accessed by a computer. In addition, any connection is appropriately referred to as a computer-readable medium. For example, if instructions are transmitted from a website, a server, or another remote source through a coaxial cable, an optical fiber, a twisted pair, a digital subscriber line (DSL), or a wireless technology such as infrared, radio, and microwave, the coaxial cable, the optical fiber, the twisted pair, the DSL, or the wireless technology such as infrared, radio, and microwave is included in a definition of the medium. However, it should be understood that the computer-readable storage medium and the data storage medium may not include a connection, a carrier, a signal, or another transitory medium, but actually mean non-transitory tangible storage media. Magnetic disks and optical discs used in this specification include a compact disc (CD), a laser disc, an optical disc, a digital versatile disc (DVD), and a Blu-ray disc. The magnetic disks generally magnetically reproduce data, and the optical discs optically reproduce data with lasers. Combinations of the above should also be included within the scope of the computer-readable medium.

Instructions may be executed by one or more processors such as one or more digital signal processors (DSP), a general-purpose microprocessor, an application-specific integrated circuit (ASIC), a field programmable gate array (FPGA), or another equivalent integrated or discrete logic circuit. Therefore, the term "processor" used in this specification may refer to the foregoing structure, or any other structure suitable for implementation of the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be all implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to perform the disclosed technologies, but are not necessarily implemented by using different hardware units. Actually, as described above, various units may be combined into a codec hardware unit in combination with appropriate software and/or firmware, or may be provided by interoperable hardware units (including the one or more processors described above).

In the foregoing embodiments, the descriptions in each embodiment have respective focuses. For a part that is not described in detail in an embodiment, refer to related descriptions in other embodiments.

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A video encoding device, comprising:
   one or more processors; and
   a computer-readable storage medium coupled to the one or more processors and storing instructions, which when executed by the one or more processors, cause the video coding device to perform operations, the operations comprising:
   obtaining a to-be-encoded video;
   encoding the to-be-encoded video to obtain a first bitstream and a second bitstream, wherein the first bitstream is obtained by performing frame skipping and encoding on the to-be-encoded video, wherein a first frame sequence comprises video frames obtained by downsampling video frames in the to-be-encoded video that are encoded into the first bitstream, and a second frame sequence comprises video frames obtained by downsampling video frames in the to-be-encoded video that are not encoded into the first bitstream, and wherein the second bitstream is obtained by encoding video frames in the second frame sequence by using video frames in the first frame sequence as key frames; and
   outputting the first bitstream and the second bitstream.

2. The video encoding device of claim 1, wherein the encoding the to-be-encoded video to obtain a first bitstream and a second bitstream comprises:
   performing frame skipping and encoding on the to-be-encoded video to obtain the first bitstream;
   reconstructing the first bitstream to obtain a third frame sequence;
   downsampling video frames in the third frame sequence to obtain the first frame sequence;
   downsampling the video frames in the to-be-encoded video that are not encoded into the first bitstream, to obtain the second frame sequence; and
   encoding the video frames in the second frame sequence by using the video frames in the first frame sequence as the key frames, to obtain the second bitstream.

3. A video decoding device, comprising:
   one or more processors; and
   a computer-readable storage medium coupled to the one or more processors and storing instructions, which when executed by the one or more processors, cause the video coding device to perform operations, the operations comprising:
   obtaining a first bitstream and a second bitstream, wherein the first bitstream is obtained by performing frame skipping and encoding on a source video, wherein a first frame sequence comprises video frames obtained by downsampling video frames in the source video that are encoded into the first bitstream, and a second frame sequence comprises video frames obtained by downsampling video frames in the source video that are not encoded into the first bitstream, and wherein the second bitstream is obtained by encoding video frames in the second frame sequence by using video frames in the first frame sequence as key frames; and
   determining a target video based on the first bitstream and the second bitstream, wherein the target video comprises content expressed in the source video.

4. The video decoding device of claim 3, wherein the determining a target video based on the first bitstream and the second bitstream comprises:

decoding the first bitstream to obtain a third frame sequence;

downsampling video frames in the third frame sequence to obtain the first frame sequence;

decoding the second bitstream by using the video frames in the first frame sequence as the key frames, to obtain the second frame sequence; and determining the target video based on the second frame sequence and the third frame sequence.

5. The video decoding device of claim 4, wherein the determining the target video based on the second frame sequence and the third frame sequence comprises:

determining an initial motion vector field of a to-be-processed frame in the second frame sequence based on the to-be-processed frame;

upsampling the initial motion vector field to obtain a to-be-processed motion vector field of the to-be-processed frame; and determining a to-be-interpolated frame based on a reference frame in the third frame sequence, wherein the target video comprises the to-be-interpolated frame.

6. The video decoding device of claim 5, wherein the determining a to-be-interpolated frame based on a reference frame in the third frame sequence comprises:

performing a bilinear interpolation operation based on the to-be-processed motion vector field and the reference frame in the third frame sequence to obtain the to-be-interpolated frame.

7. The video decoding device of claim 5, wherein the operations further comprise:

determining illumination change information between the to-be-processed frame and a sampled video frame, wherein the sampled video frame is in the first frame sequence and is obtained by downsampling the reference frame; and wherein the determining a to-be-interpolated frame based on a reference frame in the third frame sequence comprises:

determining the to-be-interpolated frame based on the illumination change information, the to-be-processed motion vector field, and the reference frame.

8. The video decoding device of claim 7, wherein the determining the to-be-interpolated frame based on the illumination change information, the to-be-processed motion vector field, and the reference frame comprises:

performing illumination change on the reference frame based on the illumination change information to obtain a target reference frame; and determining the to-be-interpolated frame based on the to-be-processed motion vector field and the target reference frame.

9. The video decoding device of claim 5, wherein the operations further comprise:

determining scene switching information between the to-be-processed frame and a sampled video frame, wherein the sampled video frame is in the first frame sequence and is obtained by sampling the reference frame; and wherein the determining a to-be-interpolated frame based on a reference frame in the third frame sequence comprises:

determining the to-be-interpolated frame based on the scene switching information, the to-be-processed motion vector field, and the reference frame.

10. The video decoding device of claim 9, wherein the reference frame comprises a forward reference frame and a backward reference frame, and the sampled video frame comprises a forward sampled video frame and a backward sampled video frame; and wherein the determining the to-be-interpolated frame based on the scene switching information, the to-be-processed motion vector field, and the reference frame comprises:

when it is determined, based on the scene switching information, that a mode of switching from the to-be-processed frame to the forward sampled video frame is a hard switching mode, determining the to-be-interpolated frame based on the to-be-processed motion vector field and the backward reference frame; and when it is determined, based on the scene switching information, that a mode of switching from the to-be-processed frame to the backward sampled video frame is a hard switching mode, determining the to-be-interpolated frame based on the to-be-processed motion vector field and the forward reference frame.

11. The video decoding device of claim 9, wherein the determining the to-be-interpolated frame based on the scene switching information, the to-be-processed motion vector field, and the reference frame comprises:

when it is determined, based on the scene switching information, that a mode of switching from the to-be-processed frame to the reference frame is a fade-in/fade-out mode, determining the to-be-interpolated frame based on the to-be-processed motion vector field, a preset luminance coefficient, and the reference frame.

12. A non-transitory computer-readable storage medium storing a computer program, which when executed by a processor, cause the processor to perform operations, the operations comprising:

obtaining a first bitstream and a second bitstream, wherein the first bitstream is obtained by performing frame skipping and encoding on a source video, wherein a first frame sequence comprises video frames obtained by downsampling video frames in the source video that are encoded into the first bitstream, and a second frame sequence comprises video frames obtained by downsampling video frames in the source video that are not encoded into the first bitstream, and wherein the second bitstream is obtained by encoding video frames in the second frame sequence by using video frames in the first frame sequence as key frames; and determining a target video based on the first bitstream and the second bitstream, wherein the target video comprises content expressed in the source video.

13. The non-transitory computer-readable storage medium of claim 12, wherein the determining a target video based on the first bitstream and the second bitstream comprises:

decoding the first bitstream to obtain a third frame sequence;

downsampling video frames in the third frame sequence to obtain the first frame sequence;

decoding the second bitstream by using the video frames in the first frame sequence as the key frames, to obtain the second frame sequence; and determining the target video based on the second frame sequence and the third frame sequence.

14. The non-transitory computer-readable storage medium of claim 13, wherein the determining the target video based on the second frame sequence and the third frame sequence comprises:

determining an initial motion vector field of a to-be-processed frame in the second frame sequence based on the to-be-processed frame;

upsampling the initial motion vector field to obtain a to-be-processed motion vector field of the to-be-processed frame; and
  determining a to-be-interpolated frame based on a reference frame in the third frame sequence, wherein the target video comprises the to-be-interpolated frame.

15. The non-transitory computer-readable storage medium of claim 14, wherein the determining a to-be-interpolated frame based on a reference frame in the third frame sequence comprises:
  performing a bilinear interpolation operation based on the to-be-processed motion vector field and the reference frame in the third frame sequence to obtain the to-be-interpolated frame.

16. The non-transitory computer-readable storage medium of claim 14, wherein the operations further comprise:
  determining illumination change information between the to-be-processed frame and a sampled video frame based on the to-be-processed frame and the sampled video frame, wherein the sampled video frame is in the first frame sequence and is obtained by downsampling the reference frame; and
  the determining a to-be-interpolated frame based on a reference frame in the third frame sequence comprises:
    determining the to-be-interpolated frame based on the illumination change information, the to-be-processed motion vector field, and the reference frame.

17. The non-transitory computer-readable storage medium of claim 16, wherein the determining the to-be-interpolated frame based on the illumination change information, the to-be-processed motion vector field, and the reference frame comprises:
  performing illumination change processing on the reference frame based on the illumination change information to obtain a target reference frame; and
    determining the to-be-interpolated frame based on the to-be-processed motion vector field and the target reference frame.

18. The non-transitory computer-readable storage medium of claim 14, wherein the operations further comprise:
  determining scene switching information between the to-be-processed frame and a sampled video frame, wherein the sampled video frame is in the first frame sequence and is obtained by sampling the reference frame; and
  the determining a to-be-interpolated frame based on a reference frame in the third frame sequence comprises:
    determining the to-be-interpolated frame based on the scene switching information, the to-be-processed motion vector field, and the reference frame.

19. The non-transitory computer-readable storage medium of claim 18, wherein the reference frame comprises a forward reference frame and a backward reference frame, and the sampled video frame comprises a forward sampled video frame and a backward sampled video frame; and
wherein the determining the to-be-interpolated frame based on the scene switching information, the to-be-processed motion vector field, and the reference frame comprises:
  when it is determined, based on the scene switching information, that a mode of switching from the to-be-processed frame to the forward sampled video frame is a hard switching mode, determining the to-be-interpolated frame based on the to-be-processed motion vector field and the backward reference frame; and
  when it is determined, based on the scene switching information, that a mode of switching from the to-be-processed frame to the backward sampled video frame is a hard switching mode, determining the to-be-interpolated frame based on the to-be-processed motion vector field and the forward reference frame.

20. The non-transitory computer-readable storage medium of claim 18, wherein the determining the to-be-interpolated frame based on the scene switching information, the to-be-processed motion vector field, and the reference frame comprises:
  when it is determined, based on the scene switching information, that a mode of switching from the to-be-processed frame to the reference frame is a fade-in/fade-out mode, determining the to-be-interpolated frame based on the to-be-processed motion vector field, a preset luminance coefficient, and the reference frame.

* * * * *